US010801483B2

(12) United States Patent
Tsubono et al.

(10) Patent No.: US 10,801,483 B2
(45) Date of Patent: Oct. 13, 2020

(54) ROLLING CYLINDER DISPLACEMENT COMPRESSOR

(71) Applicant: HITACHI-JOHNSON CONTROLS AIR CONDITIONING, INC., Tokyo (JP)

(72) Inventors: Isamu Tsubono, Tokyo (JP); Hirokatsu Kosokabe, Tokyo (JP); Yasuhiro Kishi, Tokyo (JP); Naohiro Tsuchiya, Tokyo (JP); Kenji Takesawa, Tokyo (JP); Keigo Watanabe, Tokyo (JP)

(73) Assignee: HITACHI-JOHNSON CONTROLS AIR CONDITIONING, INC., Tokyo (JP)

( * ) Notice: Subject to any disclaimer, the term of this patent is extended or adjusted under 35 U.S.C. 154(b) by 0 days.

(21) Appl. No.: 16/661,169

(22) Filed: Oct. 23, 2019

(65) Prior Publication Data
US 2020/0056600 A1    Feb. 20, 2020

Related U.S. Application Data

(63) Continuation of application No. PCT/JP2018/015467, filed on Apr. 13, 2018.

(30) Foreign Application Priority Data

Apr. 24, 2017    (JP) ................. 2017-085326

(51) Int. Cl.
*F04B 39/02*    (2006.01)
*F04B 27/00*    (2006.01)
(Continued)

(52) U.S. Cl.
CPC .......... *F04B 39/023* (2013.01); *F04B 27/005* (2013.01); *F04B 27/02* (2013.01); *F16J 10/02* (2013.01)

(58) Field of Classification Search
CPC ....... F04B 27/005; F04B 27/02; F04B 39/023
See application file for complete search history.

(56) References Cited

U.S. PATENT DOCUMENTS 5,476,371 A * 12/1995 Dreiman ............. F04B 39/0016
417/550
8,011,900 B2 * 9/2011 Possamai ............. F04B 39/023
417/372
(Continued)

FOREIGN PATENT DOCUMENTS

JP    2016-173045 A    9/2016
WO    2016/067355 A1    5/2016

OTHER PUBLICATIONS

International Search Report of PCT/JP2018/015467 dated Jul. 17, 2018.

*Primary Examiner* — Michael Leslie
(74) *Attorney, Agent, or Firm* — Mattingly & Malur, PC

(57) ABSTRACT

A rolling cylinder displacement compressor including a minimum pressure bypass port as an opening of a minimum pressure bypass valve flow path, which is connected to a compression chamber formed in the compression portion in a lowest pressure state, of the bypass valve flow path is arranged such that a compression chamber faces an opening of the discharge flow path or the minimum pressure bypass port. The minimum pressure bypass port may be configured such that a minimum pressure port center as the center of the minimum pressure bypass port is arranged in a rotation advanced-side region with respect to an advanced radius line as a line connecting a cylinder advanced corner point of the compression chamber at the start of a compression stroke and the rotation center of the rolling cylinder.

10 Claims, 20 Drawing Sheets

(51) Int. Cl.
*F16J 10/02* (2006.01)
*F04B 27/02* (2006.01)

(56) References Cited

U.S. PATENT DOCUMENTS

| | | | |
|---|---|---|---|
| 9,664,190 B2* | 5/2017 | Kim | F04B 39/023 |
| 2006/0013708 A1* | 1/2006 | Yap | F04B 39/023 |
| | | | 417/410.1 |

* cited by examiner

ROLLING CYLINDER ROTATION DIRECTION

ROLLING CYLINDER ROTATION DIRECTION

POSITION OF PISTON CYLINDER PERIPHERAL SURFACE 3x WHEN REVOLVING PISTON 3 IS CLOSER TO LEFT IN CYLINDER GROOVE 1c

POSITION OF PISTON LONG HOLE PERIPHERAL SURFACE 3y WHEN REVOLVING PISTON 3 IS CLOSER TO LEFT IN CYLINDER GROOVE 1c

ROLLING CYLINDER DISPLACEMENT COMPRESSOR

CROSS-REFERENCE TO RELATED APPLICATION

The present application is a continuation application of International Application No. PCT/JP2018/015467, filed on Apr. 13, 2018, which claims priority to Japanese Patent Application No. 2017-085326, filed on Apr. 24, 2017. The contents of these applications are incorporated herein by reference in their entirety.

BACKGROUND

1. Technical Field

The present invention relates to a rolling cylinder displacement compressor.

2. Related Art

A rolling cylinder displacement compressor is a compressor utilizing a geometrically-unique locus (a hypocycloid).

Patent Literature 1 discloses a rolling cylinder displacement compressor configured such that the pressure of an oil storage portion is equal to the pressure of a discharge chamber and an oil communication path connecting the oil storage portion and a slide groove is provided to supply lubrication oil of the oil storage portion to a fixing pin and the slide groove, the rolling cylinder displacement compressor having a bypass hole. This rolling cylinder displacement compressor has a specific volume ratio.

SUMMARY

A rolling cylinder displacement compressor according to an embodiment of the present disclosure includes: a circular columnar rolling cylinder having a cylinder groove; a revolving piston having a slide groove; a stationary cylinder having a pin mechanism; a piston revolving drive source as a drive source of revolving motion of the revolving piston; a drive transmission portion connecting the revolving piston and the piston revolving drive source; a frame through which the drive transmission portion penetrates; and a casing incorporating the revolving piston, the rolling cylinder, the stationary cylinder, the piston revolving drive source, the drive transmission portion, and the frame. The revolving piston, the rolling cylinder, and the stationary cylinder form a compression portion, the revolving piston relatively performs reciprocation motion in the cylinder groove, the stationary cylinder is provided with a suction flow path, a discharge flow path, and a bypass valve flow path, a suction chamber, a compression chamber, and a discharge chamber are formed by the reciprocation motion in the compression portion, a minimum pressure bypass port as an opening of a minimum pressure bypass valve flow path, which is connected to the compression chamber formed in the compression portion in a lowest pressure state, of the bypass valve flow path is arranged such that the compression chamber faces at least one of an opening of the discharge flow path or the minimum pressure bypass port, and the minimum pressure bypass port is configured such that a minimum pressure port center as the center of the minimum pressure bypass port is arranged in a rotation advanced-side region with respect to an advanced radius line as a line connecting a cylinder advanced corner point of the compression chamber at the start of a compression stroke and the rotation center of the rolling cylinder.

DETAILED DESCRIPTION

Figure 1:
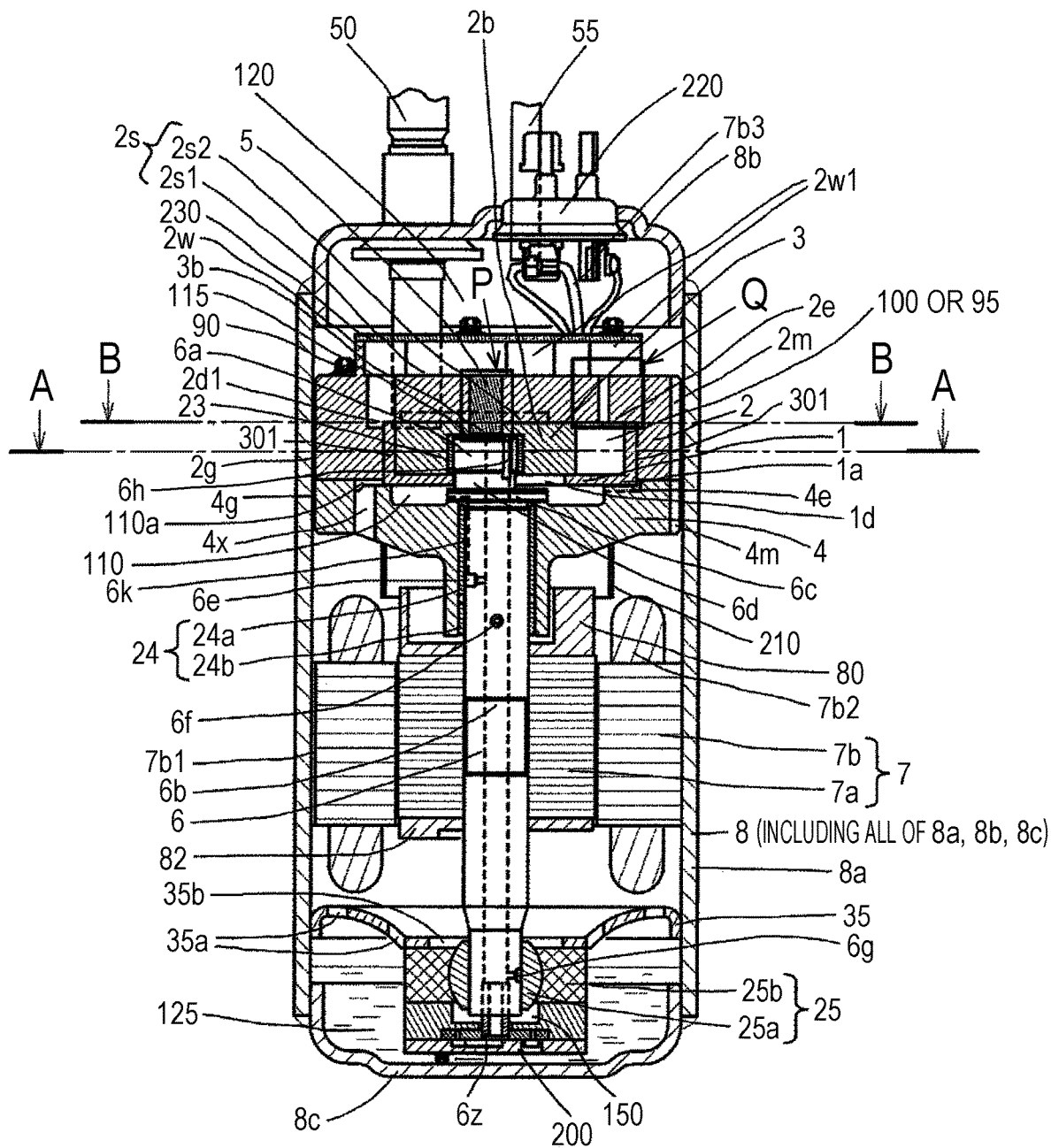
FIG. 1 is a longitudinal sectional view crossing a bypass valve and a discharge flow path of an RC compressor according to a first embodiment.

In the rolling cylinder displacement compressor having the specific volume ratio as described in Patent Literature 1, a rotation angle period (a rolling cylinder rotation angle period) in which a minimum-volume-ratio-side bypass valve flow path (a compression chamber pressure level is lowest, and therefore, hereinafter referred to as a "minimum pressure bypass valve flow path") connected to a compression chamber right after the start of a specific compression stroke opens is short. Thus, for placing the bypass valve flow path in the compression chamber across the entire period of the specific compression stroke, there is a problem that the number of bypass valve flow paths facing the high-pressure-ratio-side compression chamber increases and a manufacturing cost increases. Moreover, even when the same number of bypass valve flow paths facing the high-pressure-ratio-side compression chamber is provided, e.g., overlapping of the rotation angle period (the rolling cylinder rotation angle period) in which multiple bypass valve flow paths open is reduced. For this reason, there is a problem that the rotation angle period (the rolling cylinder rotation angle period) in which bypass valve flow path resistance decreases is shortened and an over-compression reduction effect and a liquid compression avoidance effect are degraded.

An object of the present invention is to reduce over-compression in a compression stroke in a rolling cylinder displacement compressor.

The rolling cylinder displacement compressor of the present invention includes a circular columnar rolling cylinder having a cylinder groove, a revolving piston having a slide groove, a stationary cylinder having a pin mechanism, a piston revolving drive source as a drive source of revolving motion of the revolving piston, a drive transmission portion connecting the revolving piston and the piston revolving drive source, a frame through which the drive transmission portion penetrates, and a casing incorporating the revolving piston, the rolling cylinder, the stationary cylinder, the piston revolving drive source, the drive transmission portion, and the frame. The revolving piston, the rolling cylinder, and the stationary cylinder form a compression portion. The revolving piston relatively performs reciprocation motion in the cylinder groove. The stationary cylinder is provided with a suction flow path, a discharge flow path, and a bypass valve flow path. A suction chamber, a compression chamber, and a discharge chamber are formed by the reciprocation motion in the compression portion. A minimum pressure bypass port as an opening of a minimum pressure bypass valve flow path, which is connected to the compression chamber formed in the compression portion in a lowest pressure state, of the bypass valve flow path is arranged such that the compression chamber faces at least one of an opening of the discharge flow path or the minimum pressure bypass port.

According to the present invention, in the rolling cylinder displacement compressor, over-compression in a compression stroke can be reduced.

The present invention relates to a compressor having a representative configuration in a form including, as three main compression elements, a revolving piston configured to revolve, a rolling cylinder configured to rotate together with the revolving piston, and a stationary cylinder incorporating these components, the compressor being a rolling cylinder displacement compressor (hereinafter referred to as an "RC compressor") configured to compress gas as working fluid by these compression elements. The working fluid described herein also includes not only non-condensable gas such as air, but also refrigerant used for an air-conditioner and a refrigerator.

In the present specification, a rolling cylinder displacement compressor including a rotation synchronization section configured to synchronize the rotation speeds of a revolving piston and a rolling cylinder and a rotation halving section configured to define the half of a revolving speed as the rotation speed of the revolving piston and configured to smoothly continue compression operation will be described, but a form not including these sections may be employed, needless to say. The compression operation of the above-described three main compression elements having the rotation synchronization section and the rotation halving section has been described in detail in Patent Literature 1, and therefore, detailed description will be omitted in the present specification.

The rolling cylinder displacement compressor is configured such that a compression chamber rotatably moves in one direction in association with the compression operation. Thus, a discharge hole opens at a compression chamber rotation position for decreasing to a compression chamber volume leading to desired discharge pressure so that a discharge flow path can be formed without a discharge valve. Such a discharge-valve-less displacement compressor utilizing movement of the compression chamber includes, for example, a scroll compressor. In such a discharge-valve-less displacement compressor, discharge flow path resistance is reduced, and therefore, an unnecessary pressure increase in the compression chamber upon discharge can be suppressed. Thus, the amount of energy consumed by the compressor is reduced, and a compressor efficiency is improved.

However, a compression chamber volume is, on the other hand, constant when the discharge hole opens to the compression chamber to start a discharge stroke, and therefore, not only the originally-constant compression chamber volume (a displacement volume) at the start of a compression stroke (at the end of a suction stroke) but also a volume ratio (a displacement volume/a compression chamber volume at the start of discharge, and referred to as a "specific volume ratio") at the start of discharge are constant. As a result, a high compressor efficiency is realized with a pressure ratio (referred to as a "specific pressure ratio," and an adiabatic index/power of working fluid of the specific volume ratio) defined by a discharge/suction pressure corresponding to the specific volume ratio, and on the other hand, the compressor efficiency is degraded in a case where operation is performed with a pressure ratio deviated from the specific pressure ratio (such a pressure ratio will be hereinafter referred to as an "operation pressure ratio").

In a case where the operation pressure ratio is lower than the specific pressure ratio, over-compression as extra compression work is caused, energy consumption increases, and the compressor efficiency is degraded. For reducing such over-compression, a bypass flow path connecting the compression chamber in the second half of the compression stroke and a discharge system is provided, and a bypass valve allowing only a flow from the compression chamber to the discharge system is placed at such a flow path. With this configuration, the compressor efficiency is improved. As described above, the bypass valve is essential for the bypass flow path, and therefore, the bypass path will be also hereinafter referred to as a "bypass valve flow path."

Further, in a case where liquefied working fluid enters the compression chamber, liquid compression is caused, and the inside of the compression chamber is at an abnormally-high pressure. Thus, a great load is on a compression portion and a bearing. For this reason, the probability of damage of these components increases, and reliability decreases. Such liquid compression is caused in the first half including the start of the compression stroke, and for this reason, the bypass valve flow path connecting the compression chamber in the first half of the compression stroke after the start of the compression stroke and the discharge system needs to be provided to ensure the reliability of the compressor.

In the case of providing the bypass valve flow path, the compression stroke might end, depending on operation conditions, and transition to the discharge stroke before the compression chamber reaches the discharge hole. For this reason, for avoiding mix-up, a discharge stroke part in which connection of the discharge flow path by the discharge hole is made will be hereinafter referred to as a "specific discharge stroke." Further, a process until connection of the discharge flow path by the discharge hole is made after the start of the compression stroke will be referred to as a "specific compression stroke."

As described above, in the discharge-valve-less rolling cylinder displacement compressor having the specific volume ratio, in an extended period of the specific compression stroke including a period right before the start of the specific compression stroke (right before the end of the suction stroke) and a period right after the end of the specific compression stroke (right after the start of the specific discharge stroke), the bypass valve flow path needs to be placed in the compression chamber (in a precise sense, a suction chamber in the period right before the start of the specific compression stroke, a discharge chamber in the period right after the end of the specific compression stroke).

Hereinafter, components and the like according to embodiments of the present invention will be described.

The discharge flow path may include a main discharge flow path and the bypass valve flow path. The main discharge flow path described herein constantly communicates with a working chamber where a working chamber volume ratio as the ratio of a working chamber volume at the start of the compression stroke to a working chamber volume is equal to or greater than a predetermined specific volume ratio. Moreover, in the bypass valve flow path, a bypass valve connected to a working chamber with a ratio of equal to or less than the specific volume ratio and the suction and discharge chambers before and after such a working chamber and configured to perform opening operation only in a case where the internal pressure of the working chamber is equal to or higher than the discharge pressure is provided in the middle.

A minimum pressure bypass port is a working-chamber-side opening of a minimum pressure bypass valve flow path, which is connected to the lowest-pressure compression chamber, of the bypass valve flow path.

The minimum pressure bypass port is configured such that a minimum pressure port center as the center of the minimum pressure bypass port is preferably arranged in a rotation advanced-side region with respect to an advanced radius line as a line connecting a cylinder advanced corner portion of the compression chamber at the start of the compression stroke and the rotation center of the rolling cylinder.

A cylinder side surface is a side surface of a cylinder groove provided at a cylinder cover surface as an inner surface of a cylinder hole and defining the compression chamber at the start of the compression stroke.

A cylinder advanced-side line is a projection figure of a cylinder advanced-side surface as a rotation advanced-side surface of the cylinder side surface on a cylinder end surface as an end surface of the cylinder cover surface.

A cylinder tip end line is a projection figure of a cylinder tip end surface as a tip end surface of a cylinder groove on the cylinder end surface.

The advanced radius line is the line connected to the rotation center of the rolling cylinder from the cylinder advanced corner point as a connection point.

The minimum pressure port center as the center of the minimum pressure bypass port is preferably arranged in the rotation advanced-side region with respect to the advanced radius line.

Further, the minimum pressure bypass port is, at 90% of a surface in terms of an area, preferably arranged in the rotation advanced-side region with respect to the advanced radius line as the line connecting the cylinder advanced corner point of the compression chamber at the start of the compression stroke and the rotation center of the rolling cylinder.

The minimum pressure bypass port is preferably arranged such that when the cylinder advanced-side line of the compression chamber passes through the minimum pressure port center as the center of the minimum pressure bypass port, the minimum pressure port center is at a position apart from a piston tip end line of the revolving piston defining the compression chamber to a cylinder tip end line side of the compression chamber.

The minimum pressure port center is preferably arranged in a region having, as a radius, a revolving diameter about a superimposition point as an intersection between the locus of an intersection between a cylinder trailing-side line of the compression chamber and the piston tip end line and the cylinder advanced-side line at the start of the compression stroke.

At least part of the minimum pressure bypass port is preferably arranged in a rotation trailing-side region with respect to the cylinder advanced-side line at the start of the compression stroke.

In other words, for avoiding liquid compression, the bypass valve flow path is preferably arranged such that a portion where the suction chamber communicates with any of the suction flow path and the bypass valve flow path is formed.

A piston tip end surface is preferably formed such that a tangent line at the intersection between the piston tip end line and the cylinder trailing-side line is, as compared to a tangent line at an intersection between a cylinder outer peripheral line as a projection figure of a cylinder outer peripheral surface as an outer peripheral surface of the rolling cylinder on the cylinder end surface and an extended line of the cylinder trailing-side line, closer to the cylinder trailing-side line.

Two piston tip end surfaces of the revolving piston may share the center axis of a single circular column, and may form a side surface of the circular column.

Each of two piston tip end surfaces of the revolving piston may have a semi-circular columnar side surface shape.

Considering productivity, the minimum pressure bypass port is preferably in a circular shape.

The bypass valve flow path may include two bypass valve flow paths.

Considering reduction in disturbance upon switching of the flow path, the bypass valve flow path preferably includes a single bypass valve flow path.

Hereinafter, the rolling cylinder displacement compressor of the present invention and advantageous effects thereof will be, using multiple embodiments, described in detail with reference to the drawings, as necessary. Note that the same figures will be used to describe elements common to the figures. Moreover, the same reference numerals in the figures of the embodiments indicate the same or equivalent elements, and overlapping description will be omitted. Note that at portions not illustrated in schematic views or not described as schematically-illustrated portions, the dimension ratios of illustrated elements or element portions indicate one embodiment. Thus, e.g., a dimension magnification relationship, a dimension ratio, and an angle in an illustrated shape also indicate one embodiment. Although specific dimension values are not limited to those of the embodiments below, the outer diameter of the rolling cylinder displacement compressor is preferably within a range from 5 mm to 2000 mm.

First Embodiment

FIG. 1 illustrates an entire configuration of an RC compressor of a first embodiment. Note that in description of this figure, the configurations described in Patent Literature 1 will be described in simplified terms.

As illustrated in this figure, the RC compressor roughly includes a compression portion, a motor 7 as a drive source, and an oil storage portion 125.

In this figure, the compression portion, the motor 7, and the oil storage portion 125 are arranged in this order from above in a casing including a casing cylindrical portion 8a, a casing upper lid 8b, and a casing lower lid 8c.

The compression portion includes, as components directly acting on working fluid to be compressed, a rolling cylinder 1, a revolving piston 3, and a stationary cylinder 2. Regarding the materials of these components, when the revolving piston 3, the rolling cylinder 1, and the stationary cylinder 2 are all made of cast iron, a cost can be suppressed low. Alternatively, the rolling cylinder 1 may be made of aluminum alloy, and the revolving piston 3 and the stationary cylinder 2 may be made of cast iron. With this configuration, the weight of the passively-rotatable rolling cylinder 1 can be reduced. Thus, occurrence of malfunction can be reduced, and operation can be smoothly performed. Further, when the revolving piston 3, the rolling cylinder 1, and the stationary cylinder 2 are all made of aluminum alloy, the weight of the entirety of the RC compressor can be reduced.

The compression portion is configured such that an upper portion thereof is covered with the stationary cylinder 2 and a lower portion thereof is covered with a frame 4. The frame 4 is provided with a main bearing 24 including an upper main bearing 24a and a lower main bearing 24b. A crankshaft 6 is rotatably supported by the main bearing 24. The crankshaft 6 protrudes downwardly.

In the compression portion, the rolling cylinder 1, the revolving piston 3, and the stationary cylinder 2 form a working chamber. The working chamber is a suction chamber 95 or a compression chamber 100.

The stationary cylinder 2 is provided with a circular eccentric cylinder hole 2b about a cylinder rotation axis as a center axis. Moreover, the stationary cylinder 2 has, at an outer peripheral surface thereof, a cylinder outer peripheral groove 2m. A bypass hole 2e penetrating from an upper surface of the stationary cylinder 2 to the eccentric cylinder hole 2b is provided. A pin mechanism 5 is provided at a bottom surface of the eccentric cylinder hole 2b.

The compression portion is provided with a suction path 2s and a discharge hole 2d1. The suction path 2s includes a suction groove 2s2 provided at the bottom surface of the eccentric cylinder hole 2b and a suction hole 2s1 connected to the suction groove 2s2 from the upper surface of the stationary cylinder 2.

At an upper portion of the stationary cylinder 2, a stationary cylinder upper wall 2w is arranged to cover the inside of a cylinder bolt 90 for attaching the stationary cylinder 2 to the frame 4. A discharge cover 230 is fixed to an upper surface of the stationary cylinder upper wall 2w, and covers the discharge hole 2d1, the bypass hole 2e, and the like. Moreover, at multiple spots of the stationary cylinder upper wall 2w, upper wall grooves 2w1 connecting an inner peripheral portion and an outer peripheral portion are provided.

The rolling cylinder 1 has a cylinder bottom end plate 1a forming a bottom surface of a cylinder groove and cylinder groove outer peripheral walls 301. Moreover, an eccentric shaft insertion hole 1d is provided at a center portion of a bottom surface of the rolling cylinder 1.

The pin mechanism 5 is inserted into a slide groove 3b of the revolving piston 3.

A revolving bearing 23 is press-fitted in a revolving bearing hole 3a (FIG. 2) provided at the revolving piston 3. An eccentric shaft 6a of the crankshaft 6 is inserted into the revolving bearing 23. The eccentric shaft 6a is connected to the revolving piston 3 through the eccentric shaft insertion hole 1d. A shaft flange portion 6c as a large-diameter portion is provided at an upper portion of the crankshaft 6. At a portion above the shaft flange portion 6c, an eccentric portion including the eccentric shaft 6a and a shaft neck 6d having a smaller diameter than that of the eccentric shaft 6a is provided.

The motor 7 includes a stator 7b arranged in a fixed manner at the casing cylindrical portion 8a and a rotor 7a arranged in a fixed manner at the crankshaft 6. The motor 7 described herein is a piston revolving drive source, and is also a shaft rotation drive source. A main balance 80 is fixed to an upper portion of the rotor 7a, and a counter balance 82 is fixed to a lower portion of the rotor 7a. These components play a role in dynamically balancing an unbalanced compression element (the revolving piston 3) which is in revolving motion in compression operation. Moreover, the stator 7b is provided with a stator winding 7b2.

The oil storage portion 125 is a region surrounded by the casing cylindrical portion 8a, the casing lower lid 8c, and a sub-frame 35.

The compression portion is arranged in a fixed manner at the casing cylindrical portion 8a by, e.g., welding.

An oil supply pump 200 having a pressure increasing capacity is provided at a lower end of the crankshaft 6. The crankshaft 6 is provided with an oil supply vertical hole 6b (an oil supply path) penetrating the center of the crankshaft 6 in a center axis direction. Further, the crankshaft 6 is provided with oil supply horizontal holes (an oil supply horizontal sub-hole 6g, an oil supply lower main horizontal hole 6f, an oil supply upper main horizontal hole 6e) connected to a sub-bearing 25, the lower main bearing 24b, and the upper main bearing 24a. Oil is supplied to the main bearing 24a by the oil supply upper main horizontal hole 6e and an oil supply main shaft groove 6k.

Part of oil discharged from the oil supply pump 200 enters an oil supply pump shaft chamber 150 through a clearance at the periphery of a pump coupling pipe 6z, and then, is supplied to the sub-bearing 25.

A region surrounded by the crankshaft 6, the revolving bearing 23, and the revolving piston 3 is a shaft eccentric end space 115. Oil is supplied to the revolving bearing 23 by the shaft eccentric end space 115 and an eccentric oil supply groove 6h.

Multiple bed radiation grooves 4e as oil passages are provided at the frame 4. A rotor cup 210 is fixed in close contact with a lower surface of the frame 4 to cover the periphery of the rotor 7a. Oil having passed through the bed radiation grooves 4e flows into a back pressure chamber 110 and a bed back pressure chamber 110a, and then, is discharged outwardly of the rotor cup 210 to below the frame 4 from an oil discharge path 4x.

At the outer periphery of the compression portion, there are clearances such as a cylinder outer peripheral clearance 2g and a frame outer peripheral clearance 4g, the cylinder outer peripheral groove 2m, and a frame outer peripheral groove 4m. These portions serve as flow paths for working fluid with discharge pressure.

A suction pipe 50 is for introducing working fluid from the outside to the compression portion provided in the casing 8. A discharge pipe 55 is for discharging working fluid pressure-increased by the compression portion to the outside. The suction pipe 50 and the discharge pipe 55 are provided at the casing upper lid 8b. In addition, a hermetic terminal 220 is provided at the casing upper lid 8b. A motor line 7b3 is connected to the hermetic terminal 220 so that power can be supplied from an external power source (not shown) to the stator winding 7b2 of the motor 7.

Working fluid introduced from the suction pipe 50 is pressure-increased by the compression portion, and then, is discharged to the outside through the discharge pipe 55.

The flow of working fluid will be described herein.

Working fluid introduced through the suction pipe 50 is compressed in the compression portion, and is blown out upwardly of the discharge hole 2d1, the bypass hole 2e and the like. Then, the working fluid temporarily collides with the discharge cover 230. At this point, oil contained in the working fluid adheres to the discharge cover 230, and is separated. The working fluid of which oil amount has decreased is blown out from the upper wall grooves 2w1. Then, the working fluid further collides with an inner wall of the casing cylindrical portion 8a, and the oil is separated again. Thereafter, the working fluid enters a casing upper chamber 120, and is discharged from the discharge pipe 55 provided at the casing upper lid 8b to the outside of the device. Note that in the casing upper chamber 120, the flow velocity of the working fluid decreases, and therefore, slightly-remaining oil mist tends to settle out and the amount of oil contained in the working fluid becomes extremely small.

No main flow of the working fluid is present below the compression portion, but the working fluid with the discharge pressure flows into below the compression portion through the cylinder outer peripheral clearance 2g and the frame outer peripheral clearance 4g as outer peripheral clearances of the compression portion and the cylinder outer peripheral groove 2m and the frame outer peripheral groove 4m as outer peripheral grooves of the compression portion. Accordingly, the entirety of a casing space including a portion below the compression portion is at the discharge pressure. That is, a high-pressure chamber method is implemented.

The sub-bearing 25 includes a ball 25a and a ball holder 25b rotatably supporting the ball 25a in all directions. A lower portion of the crankshaft 6 is inserted into the ball 25a, and the ball 25a is attached to the ball holder 25b. Thereafter, the ball holder 25b is arranged in a fixed manner at the sub-frame 35 welded to the casing cylindrical portion 8a. Accordingly, the sub-bearing 25 rotatably supports the lower portion of the crankshaft 6.

Next, the flow of part of oil flowing below the compression portion will be described.

Oil flowing out of the oil discharge path 4x to below the frame 4 flows to the outside of the rotor cup 210 fixed in close contact with the lower surface of the frame 4 to cover the periphery of the rotor 7a. Then, the oil drops onto the stator 7b along the outer periphery of the rotor cup 210, and reaches a space below the motor 7 through a hole through which the stator winding 7b2 passes and a stator cut surface 7b1 at the outer periphery of the motor 7. Thereafter, the oil returns to the oil storage portion 125 through a sub-frame peripheral hole 35a, except that a small amount of oil is supplied to the inner and outer peripheries of the ball 25a of the sub-bearing 25 through a sub-frame center hole 35b.

Note that the RC compressor can be also placed with the center axis of the cylindrical casing being in the horizontal direction (a lateral direction). In this case, there is no problem even when the center axis of the cylinder is inclined. Note that in this case, arrangement of the sub-frame peripheral hole 35a and the sub-frame center hole 35b of the sub-frame 35 as a partition for the oil storage portion 125 needs to be adjusted such that a proper amount of lubrication oil is accumulated in the oil storage portion 125.

In description below, differences from the configuration of each figure described in Patent Literature 1 will be described, and the same contents as those of the configurations described in Patent Literature 1 will not be described.

Figure 2:
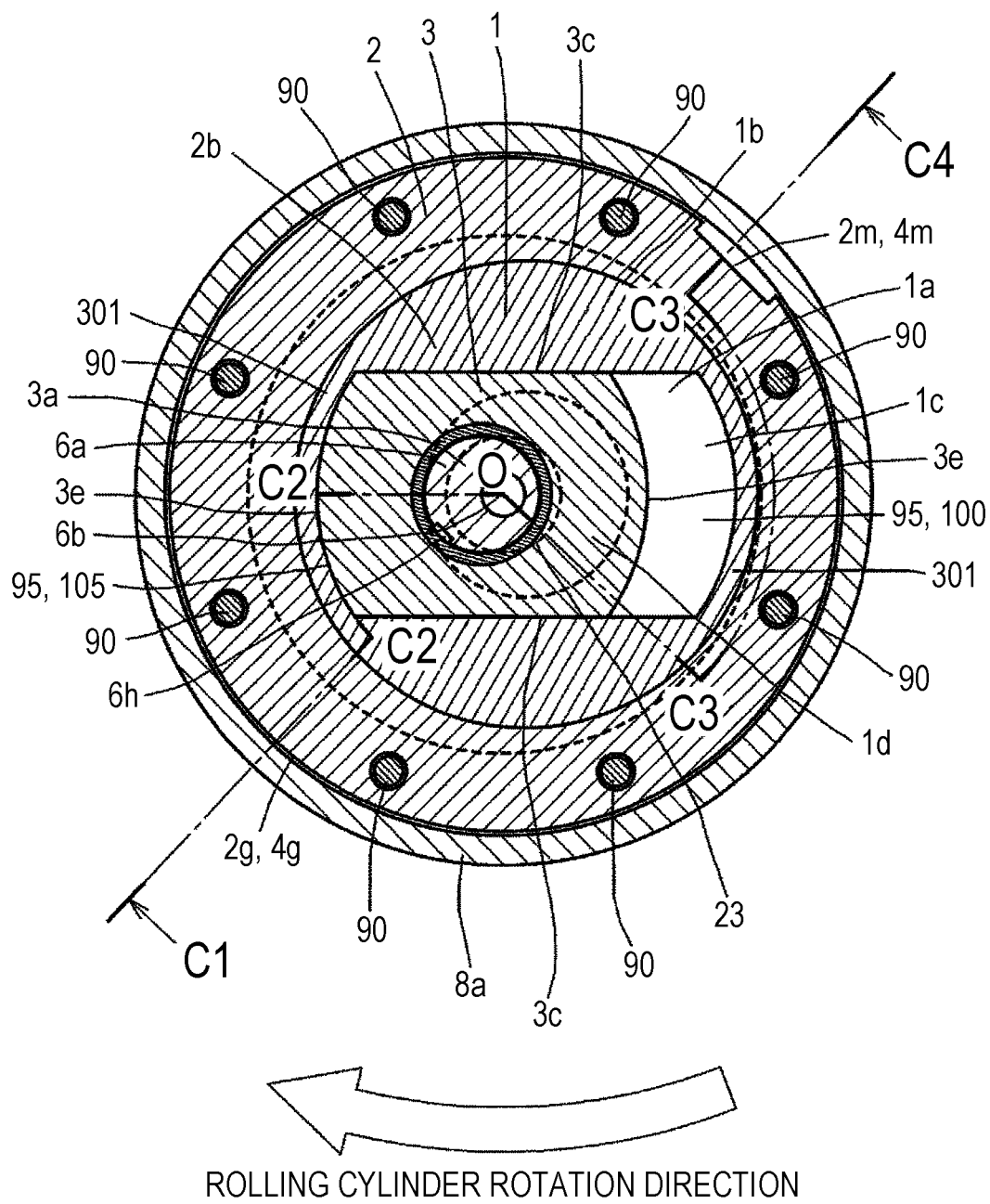
FIG. 2 is an A-A sectional view of FIG. 1.

FIG. 2 is an A-A sectional view (a compression chamber formation portion) of FIG. 1.

Figure 3:
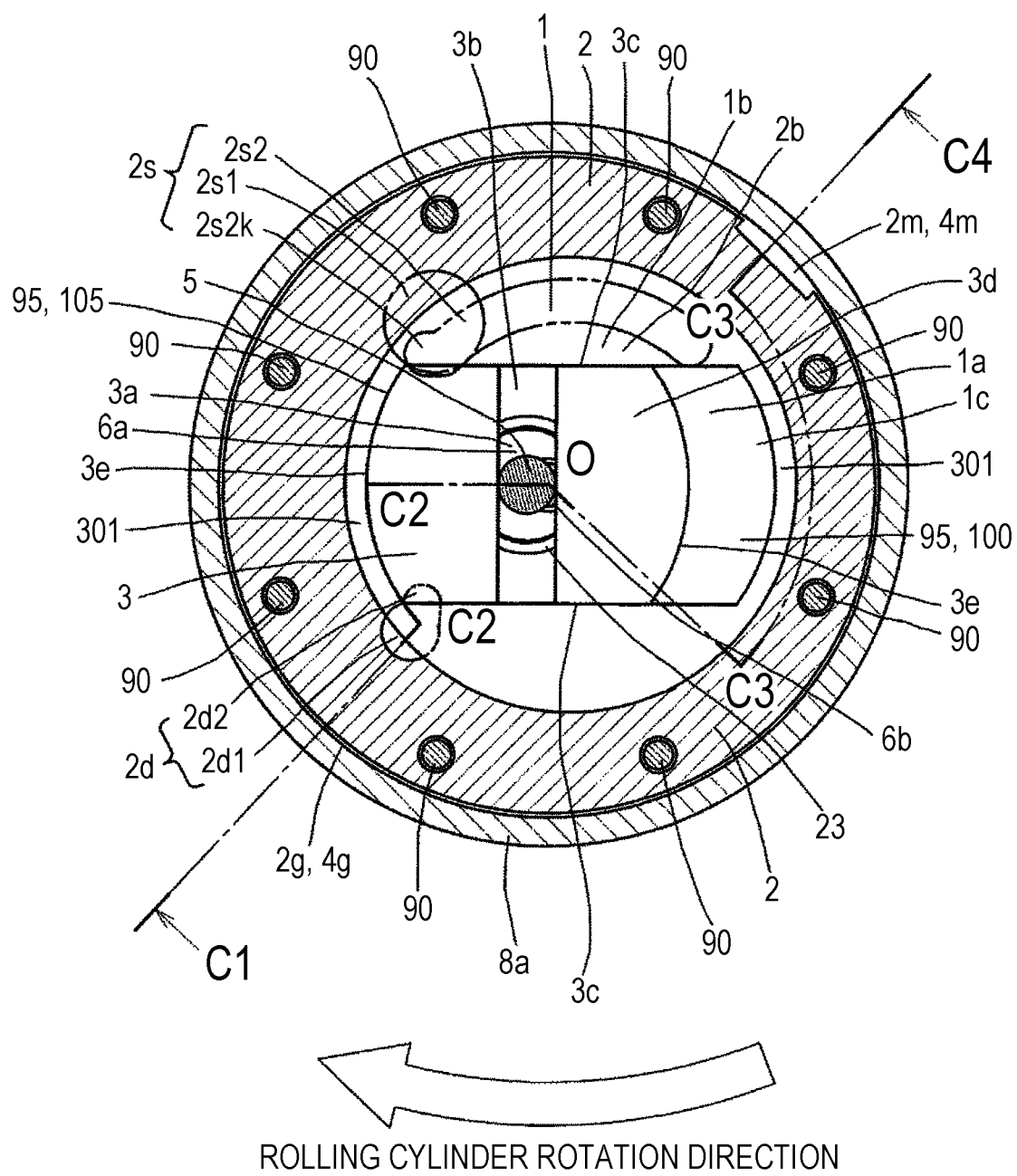
FIG. 3 is a B-B sectional view of FIG. 1.

FIG. 3 is a B-B sectional view (a cross-sectional view in a clearance between the revolving piston and the stationary cylinder above the rolling cylinder).

Note that C1-C2-O-C3-C4 illustrated in FIGS. 2 and 3 is a portion corresponding to a longitudinal sectional view of FIG. 1, and FIG. 1 is the longitudinal sectional view along C1-C2-O-C3-C4. Each of C2 and C3 described herein is at two spots in FIGS. 2 and 3, and this means that a portion between C2 and C2 and a portion between C3 and C3 are omitted in FIG. 1.

In FIG. 2, the cylinder groove outer peripheral walls 301 are provided at the rolling cylinder 1. The cylinder groove outer peripheral walls 301 are provided at both end portions in reciprocation motion of the revolving piston 3 in a cylinder groove 1c. In other words, a cylinder circular column is provided with the cylinder groove outer peripheral walls 301 for separating the cylinder groove 1c and a cylinder outer peripheral surface as an outer peripheral surface of the rolling cylinder 1. Thus, no suction hole is provided in the section illustrated in FIG. 2.

The cylinder outer peripheral groove 2m is provided at part of the outer peripheral surface of the stationary cylinder 2, and is arranged to communicate with the frame outer peripheral groove 4m provided at the frame therebelow.

In FIG. 3, the suction path 2s actually provided at the bottom surface of the eccentric cylinder hole 2b of the stationary cylinder 2 is indicated by a chain double-dashed line. The suction path 2s includes the suction groove 2s2 provided at the bottom surface of the eccentric cylinder hole 2b, the suction hole 2s1 connected to the suction groove 2s2 from the upper surface of the stationary cylinder 2, and a suction groove bending portion 2s2k. The suction groove 2s2 is provided at a position closer to the inside with respect to an inner surface of the cylinder groove outer peripheral wall 301. The suction groove bending portion 2s2k is provided outward of the inner surface of the cylinder groove outer peripheral wall 301 and inward of an outer surface of the cylinder groove outer peripheral wall 301. The suction groove 2s2 and the suction groove bending portion 2s2k communicate with the upper portion of the stationary cylinder 2 by the suction hole 2s1.

A discharge groove 2d2 and the discharge hole 2d1 are provided at the bottom surface of the eccentric cylinder hole 2b. The discharge hole 2d1 is connected to the discharge groove 2d2 from the upper surface of the stationary cylinder 2. The discharge groove 2d2 and the discharge hole 2d1 form a discharge path 2d.

To summarize, it is configured such that the suction path 2s (a suction flow path) and the discharge path 2d (a discharge flow path) are provided at the stationary cylinder 2 and face the working chamber of the compression portion at a position closer to the center axis with respect to an inner wall surface of the cylinder groove outer peripheral wall 301.

Figure 4:
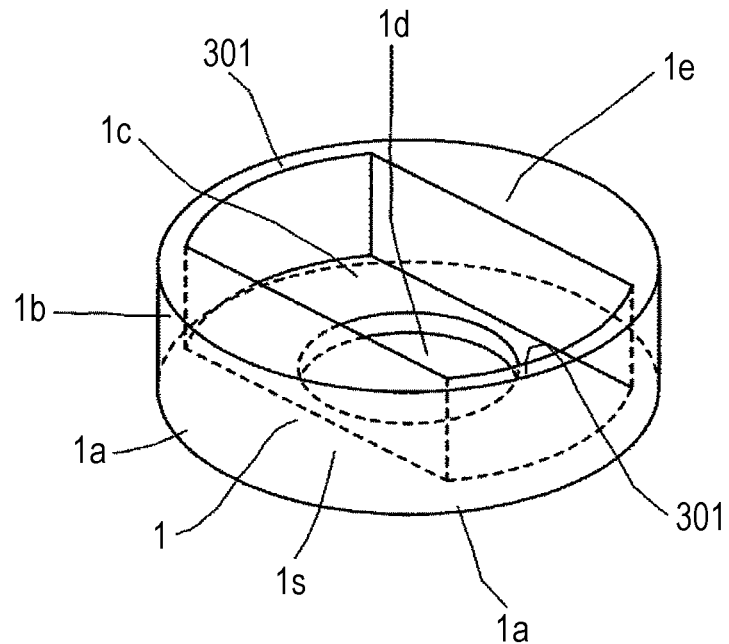
FIG. 4 is a perspective view of a rolling cylinder of the RC compressor according to the first embodiment.

FIG. 4 is a perspective view of the rolling cylinder of the present embodiment.

As illustrated in this figure, the cylinder groove outer peripheral walls 301 are provided to the same height as that of a cylinder upper portion 1e at the rolling cylinder 1. With this configuration, all side surfaces of the working chamber are sealed. The eccentric shaft insertion hole 1d is provided at a center portion of a bottom surface of the cylinder groove 1c.

Figure 13:
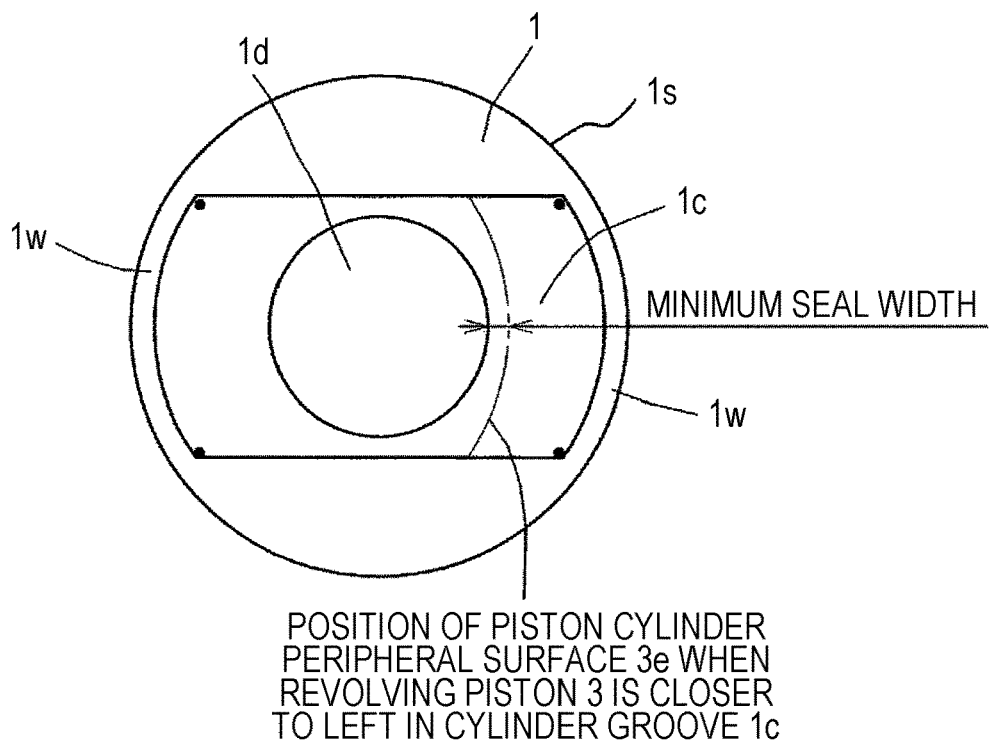
FIG. 13 is an upper view of a rolling cylinder of the RC compressor according to the first embodiment.

FIG. 13 is an upper view of an example where the shape of the cylinder groove outer peripheral wall 301 of the rolling cylinder of FIG. 4 is limited.

In FIG. 13, uniform walls 1w having a uniform thickness are provided as the cylinder groove outer peripheral walls at the rolling cylinder 1. Moreover, the position of each piston eccentric circular column tip end surface 3e (a piston tip end surface) when the revolving piston 3 is closer to the left uniform wall 1w in the cylinder groove 1c as viewed in the figure is indicated by a chain double-dashed line. The minimum value of a distance between the piston eccentric circular column tip end surface 3e and a right end of the eccentric shaft insertion hole 1d as viewed in the figure is the minimum seal width. The minimum seal width is sufficiently ensured so that seal of the working chamber formed by the revolving piston 3 in the cylinder groove 1c can be reliably made.

The rolling cylinder 1 includes a cylinder circular column 1b formed in a circular columnar shape and having the cylinder groove 1c about a rolling axis as a center axis and the cylinder bottom end plate 1a forming the bottom surface of the cylinder groove 1c. The cylinder groove 1c is provided to open at an end surface of the cylinder circular column 1b on an opposite cylinder bottom end plate side, and about a cylinder groove axis perpendicular to the rolling axis as a center axis, has flat parallel side surfaces having a certain width and provided parallel to the rolling axis. Further, the bottom surface of the cylinder groove 1c is parallel to an upper surface (the cylinder upper portion 1e of FIG. 4) of the cylinder circular column 1b.

As illustrated in FIG. 13, the cylinder groove 1c has the cylinder groove outer peripheral wall (the uniform wall 1w) between the cylinder groove 1c and a cylinder outer peripheral surface 1s. A processable curvature radius R is provided at each corner portion (a spot indicated by a small black circle) of the cylinder groove 1c. For example, in the case of processing the cylinder groove 1c by an end mill, R of the corner portion (the spot indicated by the small black circle) is equal to or greater than the radius of the end mill to be used. Moreover, in the case of separating the cylinder circular column 1b and the cylinder bottom end plate 1a as described later, processing by wire cut as electric spark machining is also conceivable. In this case, R is about a radius to which a wire radius and a clearance to be removed by discharge are added.

For clearance-fitting the revolving piston 3 in the cylinder groove 1c, the shape of each corner portion (a spot indicated by a small white circle in FIG. 14) of the revolving piston 3 is adjusted such that such a corner portion does not contact the corner portion (the spot indicated by the small black circle) of the cylinder groove 1c. For example, the corner portion of the revolving piston 3 may have a slightly-greater curvature radius than R of the corner portion (the spot indicated by the small black circle) of the cylinder groove 1c. Alternatively, the corner portion of the revolving piston 3 may be chamfered, and processing is facilitated. The revolving piston 3 described herein performs the revolving motion with a revolving radius E (FIG. 6 described later) in such a manner that the eccentric shaft 6a of the crankshaft 6 having the revolving radius E is inserted into the revolving bearing 23 and the crankshaft 6 is rotated. Thus, the eccentric shaft insertion hole 1d is provided at the center of the bottom surface of the cylinder groove 1c.

Note that the revolving piston 3 performs the reciprocation motion in the cylinder groove 1c. Thus, even in a case where the revolving piston 3 is closer to an end of the cylinder groove 1c, the length of the revolving piston 3 needs to be extended such that the eccentric shaft insertion hole 1d is hidden behind the revolving piston 3 and the seal width (the minimum seal width is illustrated in FIG. 13) is ensured. When the length of the revolving piston 3 is extended, the length of the cylinder groove 1c needs to be extended, and the diameter of the cylinder circular column 1b increases. Accordingly, the diameter of the rolling cylinder 1 increases, and the diameter of the stationary cylinder 2 incorporating the rolling cylinder 1 increases. For this reason, there is a problem that the diameter of the casing 8 increases and the diameter of the RC compressor increases.

As illustrated in FIG. 1, in the present embodiment, the shaft neck 6d is provided such that the shaft neck 6d as a portion having a smaller diameter than that of the eccentric shaft 6a passes through the eccentric shaft insertion hole 1d. As a result, the seal width can be ensured while the eccentric shaft insertion hole 1d is downsized, and therefore, the effect of suppressing an increase in the diameter of the RC compressor is provided.

Figure 5:
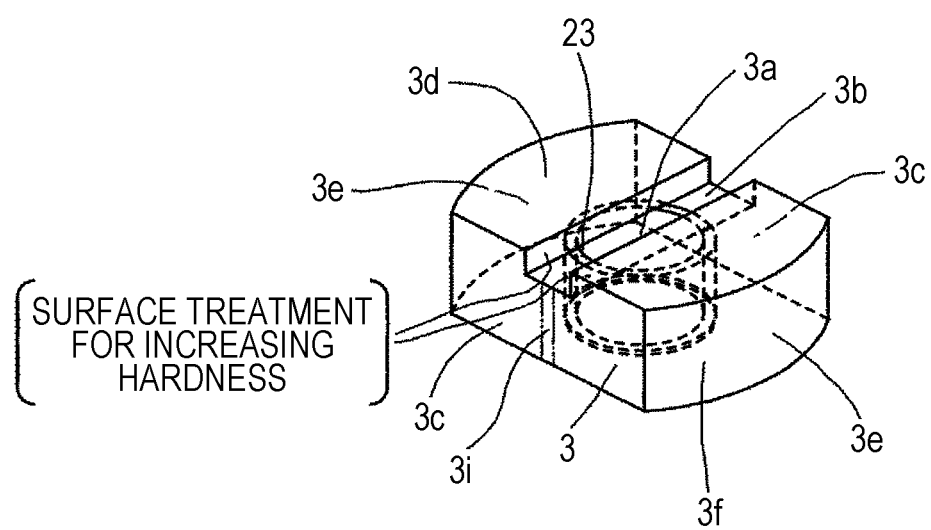
FIG. 5 is a perspective view of a revolving piston of the RC compressor according to the first embodiment.

FIG. 5 is a perspective view of the revolving piston.

As illustrated in this figure, the revolving piston 3 is configured such that two parallel piston cut surfaces 3c provided parallel to a revolving axis are provided at side surfaces of a circular columnar material having a small thickness. An upper bottom surface of the revolving piston 3 is a piston upper surface 3d, and a lower bottom surface of the revolving piston 3 is a piston lower surface 3f. The piston upper surface 3d and the piston lower surface 3f are piston side end surfaces, and are parallel to each other. Moreover, the piston upper surface 3d and the piston lower surface 3f are flat.

The piston upper surface 3d is provided with the slide groove 3b. The piston lower surface 3f is provided with the revolving bearing hole 3a having a circular section. The revolving bearing 23 is press-fitted in the revolving bearing hole 3a.

The slide groove 3b is formed with such a depth that the slide groove 3b communicates with the revolving bearing hole 3a. With this configuration, an oil supply path to the revolving bearing 23 and an oil supply path to the slide groove 3b are used in common, and therefore, an oil supply system is simplified. Thus, the effect of reducing a manufacturing cost is provided. Moreover, the slide groove 3b extends to the outer peripheries of the piston cut surfaces 3c. With this configuration, motion of a cutting tool upon groove processing is uniform, and therefore, the effect of improving groove shape accuracy is provided.

In this figure, a piston cut groove 3i connected to the slide groove 3b may be provided at a center portion of the piston cut surface 3c as indicated by a chain double-dashed line. Although not shown in the figure, a piston cut groove 3i may be also similarly provided at the piston cut surface 3c on the opposite side. With this configuration, oil can be sufficiently supplied to the side surfaces of the cylinder groove 1c of FIG. 4 and seal clearances of the piston cut surfaces 3c, and therefore, the effect of further reducing internal leakage and friction is provided.

Moreover, the slide groove 3b also serves as an oil supply path to the piston cut surfaces 3c. In the present embodiment, a slide axis is in a normal direction of a cut axis (an axis perpendicular to a revolving bearing axis). That is, the slide axis is provided in a direction perpendicular to two piston cut surfaces 3c parallel to the cut axis. A pin axis adjustment angle d is 0 degree.

Further, a fixing pin 5s (FIG. 9) is inserted into the slide groove 3b, and for this reason, there is the risk of abrasion. For this reason, for reducing the risk of abrasion, surface treatment for increasing the hardness of side flat surfaces of the slide groove 3b may be performed. For example, when the revolving piston 3 is made of iron, e.g., carburizing or nitriding is conceivable. Moreover, when the revolving piston 3 is made of aluminum alloy, e.g., alumite treatment is conceivable.

Figure 14:
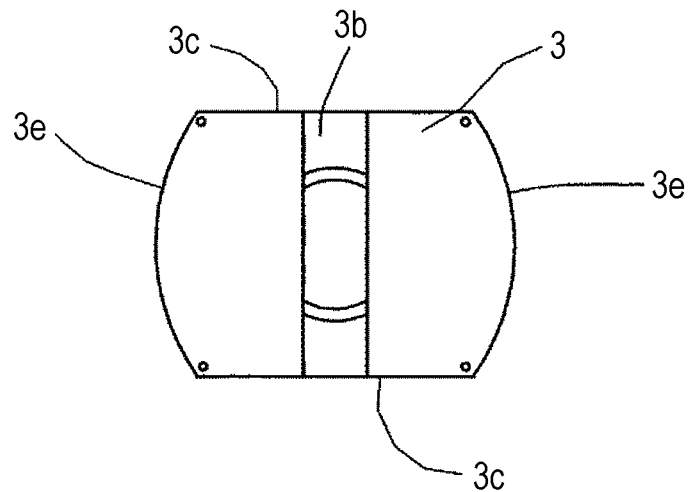
FIG. 14 is an upper view of the revolving piston of the RC compressor according to the first embodiment.

FIG. 14 is an upper view of the revolving piston.

As illustrated in this figure, when the revolving piston 3 is viewed from above, the revolving bearing hole 3a and the revolving bearing 23 are partially visible in the slide groove 3b. The piston eccentric circular column tip end surface 3e is one of the surfaces forming the working chamber.

The revolving piston 3 is clearance-fitted in the cylinder groove 1c of FIG. 13. When the piston eccentric circular column tip end surface 3e and the uniform wall 1w of FIG. 13 contact each other due to motion of the revolving piston 3, the piston eccentric circular column tip end surface 3e and an inner wall surface of the uniform wall 1w preferably have the same shape (curvature) such that the working chamber is narrowed as much as possible. Moreover, the shape of the corner portion (the spot indicated by the small white circle in FIG. 14) of the revolving piston 3 is adjusted such that such a corner portion does not contact the corner portion (the spot indicated by the small black circle in FIG. 13) of the cylinder groove 1c. For example, the corner portion of the revolving piston 3 may have a greater curvature radius than the curvature radius R of the corner portion (the spot indicated by the small black circle in FIG. 13) of the cylinder groove 1c.

Figure 6:
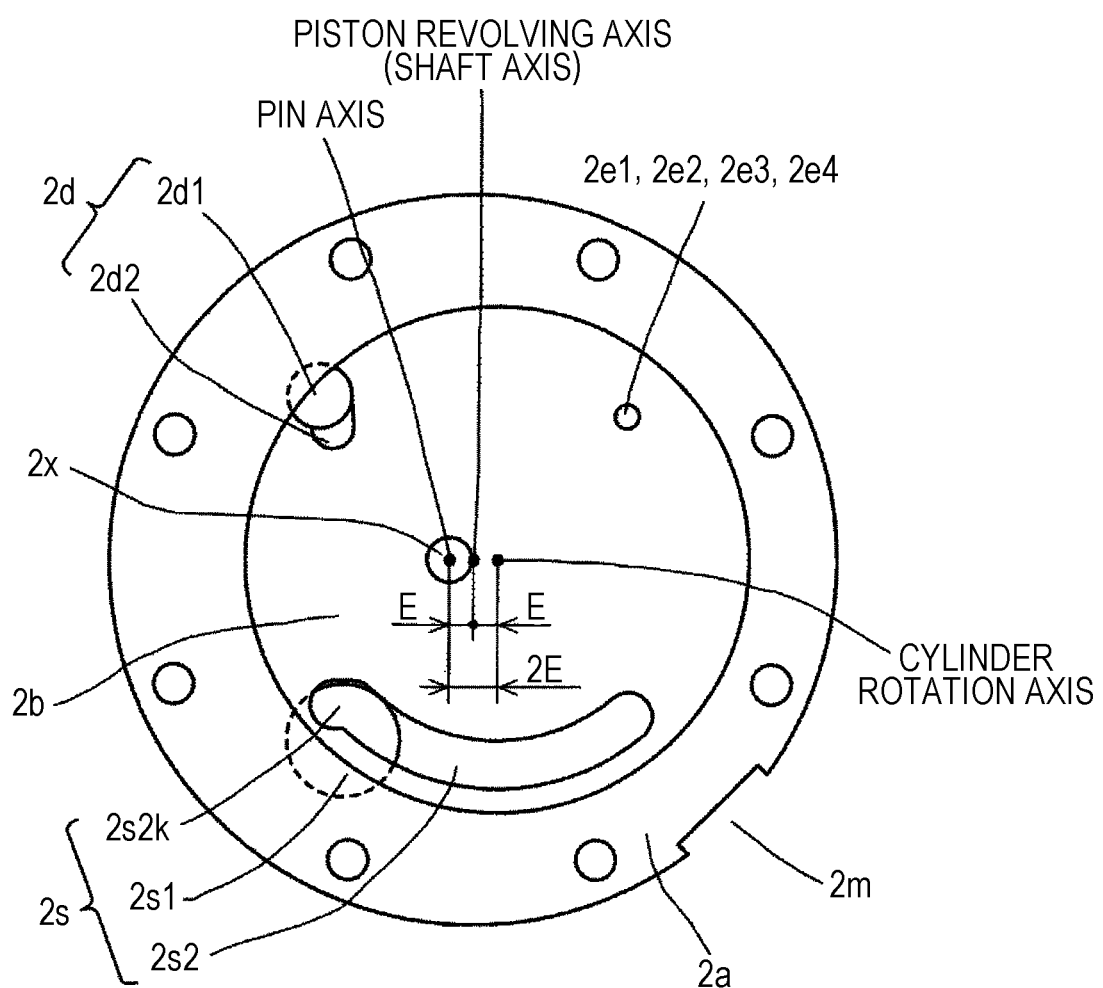
FIG. 6 is a bottom view of a stationary cylinder having a fixing pin according to the first embodiment.

FIG. 6 is a bottom view of the stationary cylinder.

In this figure, arrangement of the cylinder outer peripheral groove 2m provided at an outer peripheral side surface of the stationary cylinder 2, the suction path 2s including the suction hole 2s1, the suction groove 2s2, and the suction groove bending portion 2s2k, the discharge path 2d including the discharge hole 2d1 and the discharge groove 2d2, and a pin fixing hole 2x is clearly illustrated.

The stationary cylinder 2 basically has a circular columnar shape about a piston revolving axis (a shaft axis) as a center axis. A cylinder attachment surface 2a as a lower surface of the stationary cylinder 2 is a surface to be attached to the frame 4. The circular eccentric cylinder hole 2b opens at a position eccentric with respect to the piston revolving axis by the revolving radius E at the cylinder attachment surface 2a. The center axis of the eccentric cylinder hole 2b is the cylinder rotation axis. A minimum pressure uniform wall bypass hole 2e1 penetrating from the upper surface of the stationary cylinder 2 to the eccentric cylinder hole 2b is provided.

The pin fixing hole 2x is provided at a position point-symmetrically to the cylinder rotation axis with respect to the piston revolving axis as the axis of symmetry. The pin mechanism 5 is placed in the pin fixing hole 2x by a later-described method. The center axis of the pin fixing hole 2x is a pin axis. As a result, the pin axis, the piston revolving axis, and the cylinder rotation axis are three axes parallel to each other on the same plane, and the pin axis and the cylinder rotation axis are arranged apart from the piston revolving axis by the same distance E. Thus, a distance between the pin axis and the cylinder rotation axis is twice as long as the revolving radius E.

Figure 12:
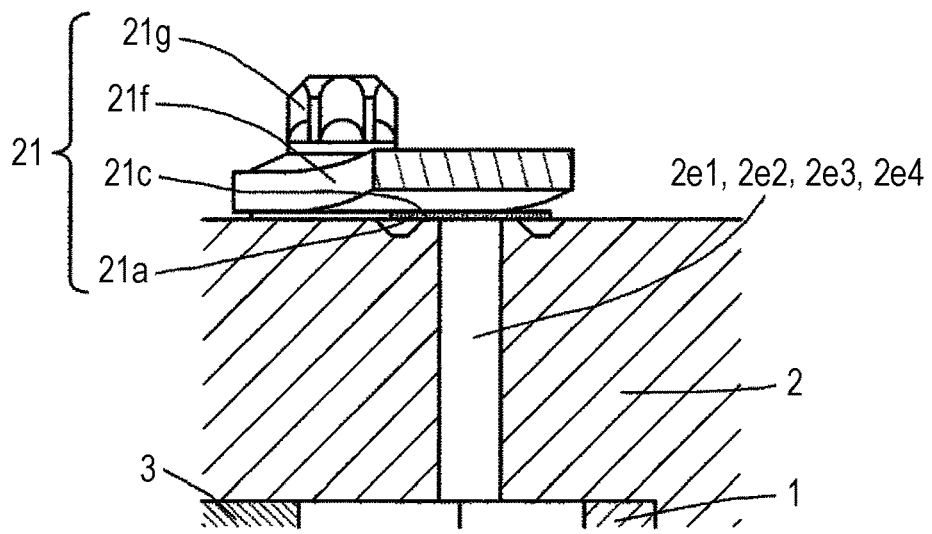
FIG. 12 is an enlarged sectional view of a Q portion of FIG. 1 illustrating a bypass valve flow path of the RC compressor according to the first embodiment.

FIG. 12 is an enlarged sectional view of a Q portion of FIG. 1, and illustrates a bypass valve flow path of the present embodiment.

As illustrated in FIG. 12, the minimum pressure uniform wall bypass hole 2e1 (the same applies to a high-pressure-side uniform wall bypass hole 2e2) downwardly penetrating from the upper surface of the stationary cylinder 2 is provided at the bottom surface of the eccentric cylinder hole 2b (see FIG. 6). Note that proper placement positions of the minimum pressure uniform wall bypass hole 2e1 and the high-pressure-side uniform wall bypass hole 2e2 will be described later in detail.

Bypass lead valves 21 are placed at upper end portions of the minimum pressure uniform wall bypass hole 2e1 and the high-pressure-side uniform wall bypass hole 2e2. The bypass lead valve 21 is configured such that a lead valve plate 21a is mounted on a lead valve seat 21c and the lead valve plate 21a and a lead retainer 21f are together fixed to the upper surface of the stationary cylinder 2 with a lead valve screw 21g. Thus, the bypass lead valve 21 is a one-direction valve allowing only the flow of working fluid in an upward direction from the eccentric cylinder hole 2b.

Figure 7:
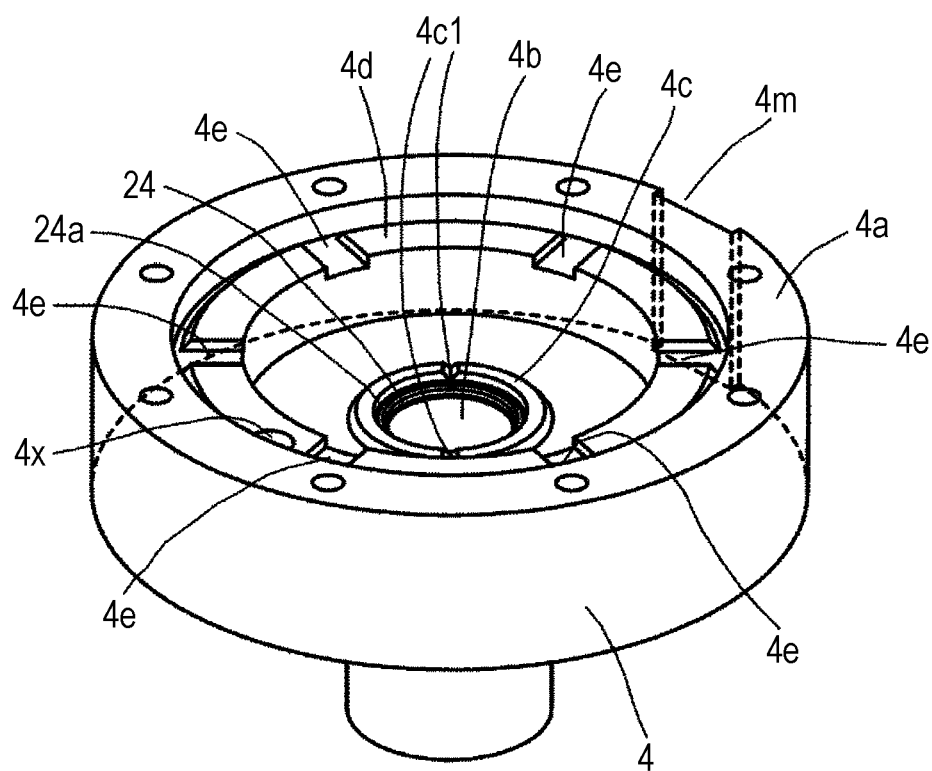
FIG. 7 is a perspective view of a frame of the RC compressor according to the first embodiment.

FIG. 7 is a perspective view of the frame as a base of the compression portion.

In this figure, the frame 4 has such a configuration that a frame attachment surface 4a to which the stationary cylinder 2 is to be attached later is an upper surface and a main bearing hole 4b is provided at a center portion. The upper main bearing 24a and the lower main bearing 24b (see FIG. 1) are press-fitted in the main bearing hole 4b, thereby forming the main bearing 24 rotatably supporting the crankshaft 6. A flange receiving surface 4c is provided at the periphery of an upper surface of the main bearing hole 4b, and flange receiving cutouts 4c1 as outlet paths of oil having lubricated the main bearing 24 are provided at one or more spots of the flange receiving surface 4c. Moreover, a bed surface 4d on which the rolling cylinder 1 is to be mounted is provided at a position surrounding the flange receiving surface 4c. The bed radiation grooves 4e as the oil passages are provided at the bed surface 4d. The frame outer peripheral groove 4m is provided at an outer peripheral portion of the frame 4.

Figure 8:
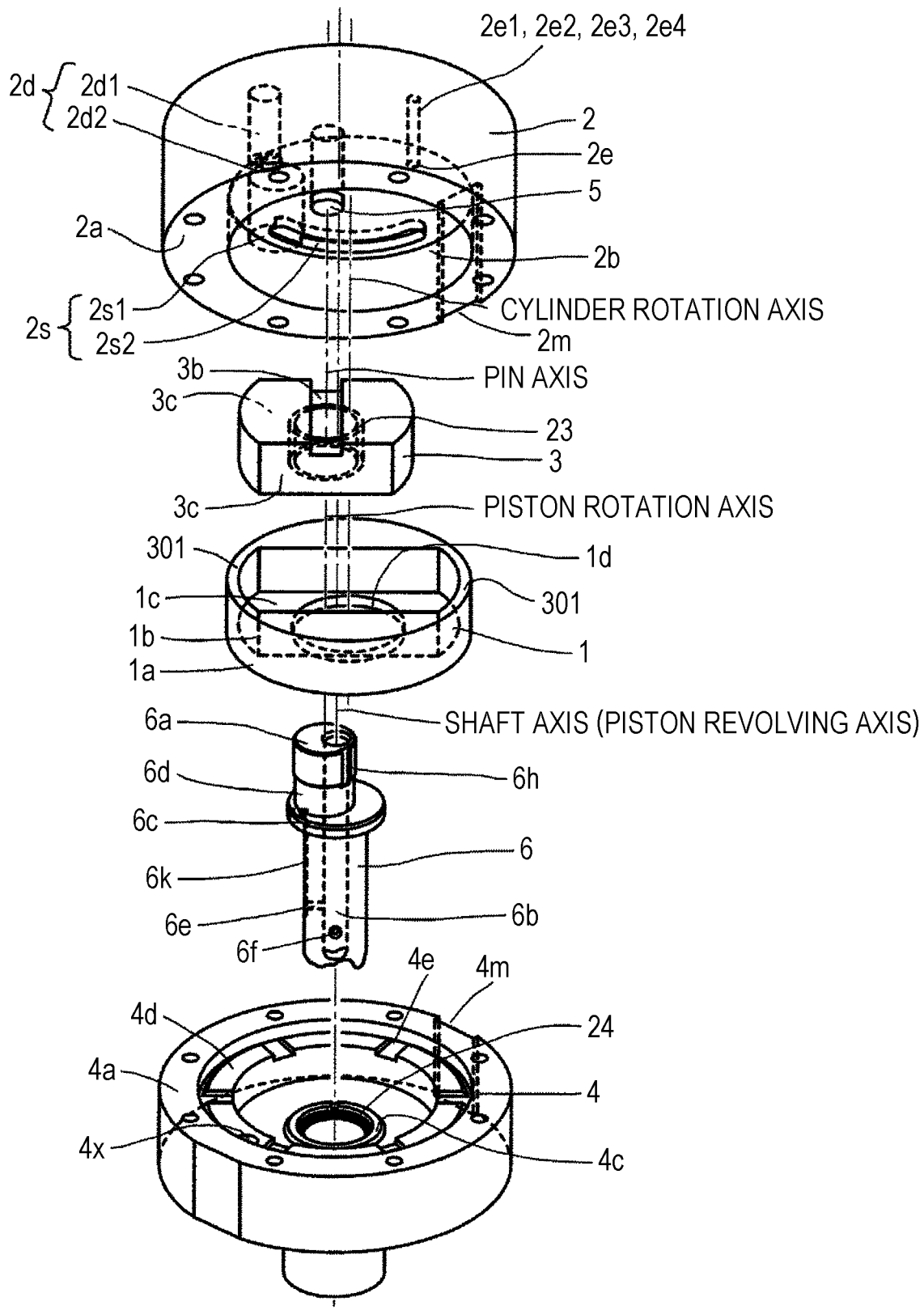
FIG. 8 is an exploded perspective view of a configuration of a compression portion of the RC compressor according to the first embodiment.

FIG. 8 is a perspective view of a state in which a combination of the components of the compression portion and the crankshaft is disassembled.

In this figure, arrangement of the cylinder outer peripheral groove 2m, the frame outer peripheral groove 4m and the like and the shapes of the eccentric shaft 6a, the shaft neck 6d, and the shaft flange portion 6c forming an upper end portion of the crankshaft 6 and the like are clearly illustrated. Moreover, the relationship of the pin axis, a piston rotation axis, the shaft axis (the piston revolving axis), and the cylinder rotation axis with each component is also clearly illustrated.

Next, the pin mechanism 5 will be described with reference to FIGS. 9 and 10.

Figure 9:
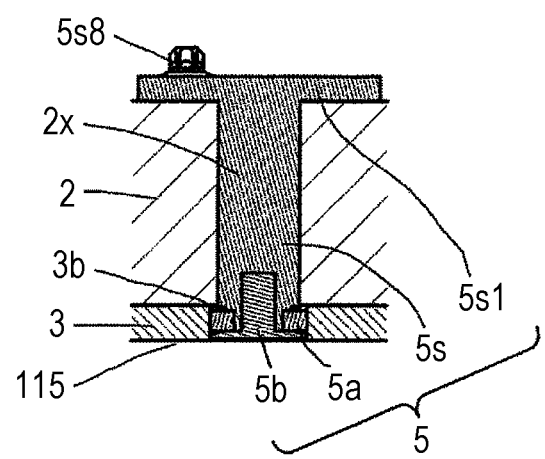
FIG. 9 is an enlarged sectional view of a P portion of FIG. 1.

FIG. 9 is an enlarged sectional view of a P portion of FIG. 1.

Figure 10:
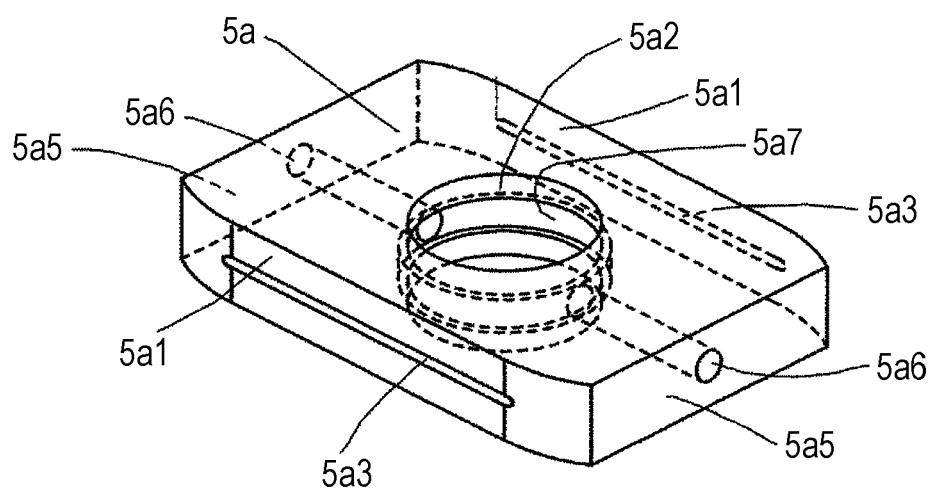
FIG. 10 is a perspective view of a slider of a pin slide mechanism of the RC compressor according to the first embodiment.

FIG. 10 is a perspective view of a slider of a pin slide mechanism of the RC compressor.

In FIG. 9, the pin mechanism 5 is placed rotatably about the pin axis on the bottom surface of the eccentric cylinder hole 2b (see FIG. 6) in such a manner that after the fixing pin 5s has passed through the center of the slider 5a, the slider 5a is sandwiched between a lower step portion of the fixing pin 5s and a slider flange 5b.

When zoomed in, the slider 5a has a configuration illustrated in FIG. 10.

Slider cut surfaces 5a1 as side surfaces of the slider 5a are clearance-fitted in the slide groove 3b (see FIG. 5). Moreover, a slider shaft hole 5a2 of the slider 5a and the fixing pin 5s are also clearance-fitted. By such fitting, a side bearing is formed.

With this configuration, an impact load on the pin mechanism 5 is applied to the slider cut surfaces 5a1 from side surfaces of the slide groove 3b, and is further applied from the slider shaft hole 5a2 to the fixing pin 5s. Regarding load exchange at two spots, the former is exchange between flat surfaces, and the latter is exchange between piston eccentric cylinder peripheral surfaces. Thus, there is no load exchange accompanied by a concentrated load. Consequently, load concentration in the pin mechanism can be avoided. As a result, the effect of reducing the risk of abrasion in a pin slide mechanism portion and improving reliability is provided. A slider group 5a3 penetrating from one end to the other end opens at each slider cut surface 5a1, and a slider horizontal through-hole 5a6 connected to a slider shaft hole groove 5a7 provided at the slider shaft hole 5a2 opens at each slider tip end surface 5a5.

The slide groove 3b (see FIG. 5) is filled with oil. Thus, the later-described pin mechanism 5 (a main portion is the slider 5a of FIGS. 9 and 10) illustrated in FIG. 11 reciprocates in the oil of the slide groove 3b while dividing the slide groove 3b. Accordingly, the oil flows from a volume-decreasing-side space of two divided slide groove spaces toward the other space in the slider groups 5a3. Similarly, the oil flows in the slider horizontal through-holes 5a6 between which the slider shaft hole groove 5a7 is interposed.

With this configuration, the effect of relieving oil compression in the slide groove 3b and improving lubrication of the slider cut surfaces 5a1 and the slider shaft hole 5a2 as slide portions to reduce a friction loss and improve a compressor efficiency is provided.

Further, when the number of slider horizontal through-holes 5a6 and the number of slider groups 5a3 increase, the effect of further relieving oil compression and improving lubrication performance is provided.

As illustrated in FIG. 9, the pin fixing hole 2x opens at the bottom of the eccentric cylinder hole 2b (see FIG. 8), and a fixing pin flange portion 5s1 of the fixing pin 5s is arranged in a fixed manner by one or more pin fixing screws 5s8. The pin mechanism 5 and the slide groove 3b of the revolving piston 3 together form the pin slide mechanism, and the pin mechanism 5 plays a role in defining a posture (a cut axis direction) in association with the revolving phase of the revolving piston 3 and smoothly continues the compression operation of the RC compressor.

Next, the configuration and operation of the compression portion will be described with reference to FIGS. 2, 3, 11, 15, and 16.

Figure 11:
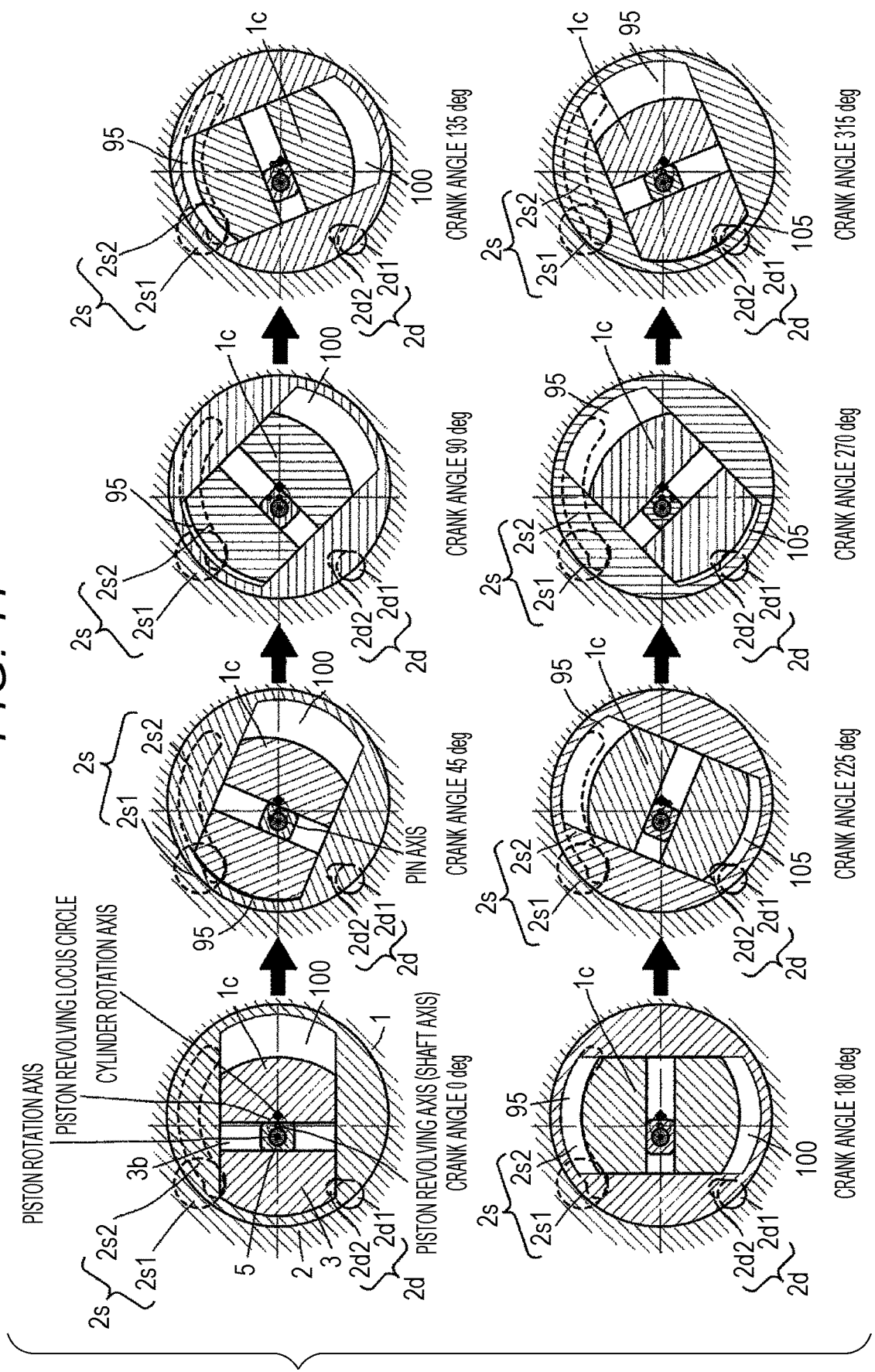
FIG. 11 is a view of the flow of compression operation of the RC compressor according to the first embodiment by means of a view in a section slightly-shifted from the B-B section of FIG. 1 to a revolving piston side.

FIG. 11 is a view for describing the compression operation by means of a section slightly shifted to a revolving piston side with respect to the B-B section of FIG. 1. In FIG. 11 described herein, the suction groove 2s2 positioned on the upper side in the B-B section is indicated by a dashed line.

Figure 15:
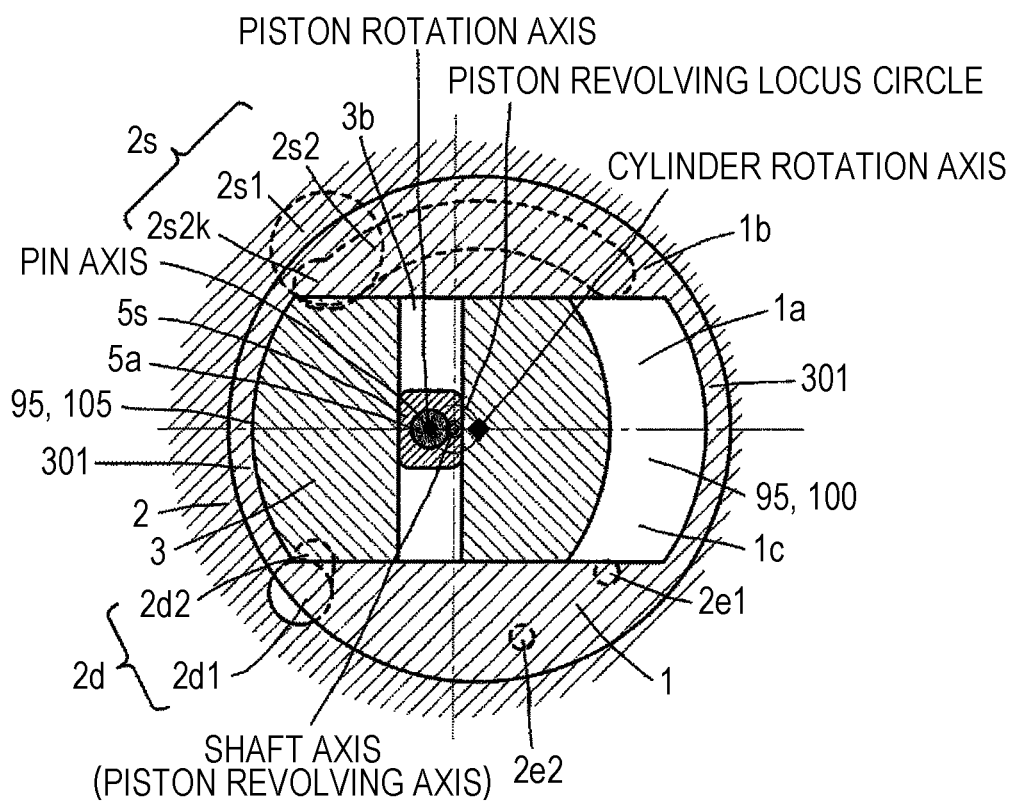
FIG. 15 is an enlarged sectional view in a state (a crank angle of 0 degree in FIG. 11) in which a working chamber at the start of a suction stroke and a working chamber at the start of a compression stroke coexist in the RC compressor according to the first embodiment.

FIG. 15 is an enlarged view when the crank angle is 0 degree as in FIG. 11. This is such timing that a working chamber where a discharge stroke transitions to a suction stroke and a volume is zero and a working chamber where the suction stroke transitions to a compression stroke and a volume is maximum coexist.

Figure 16:
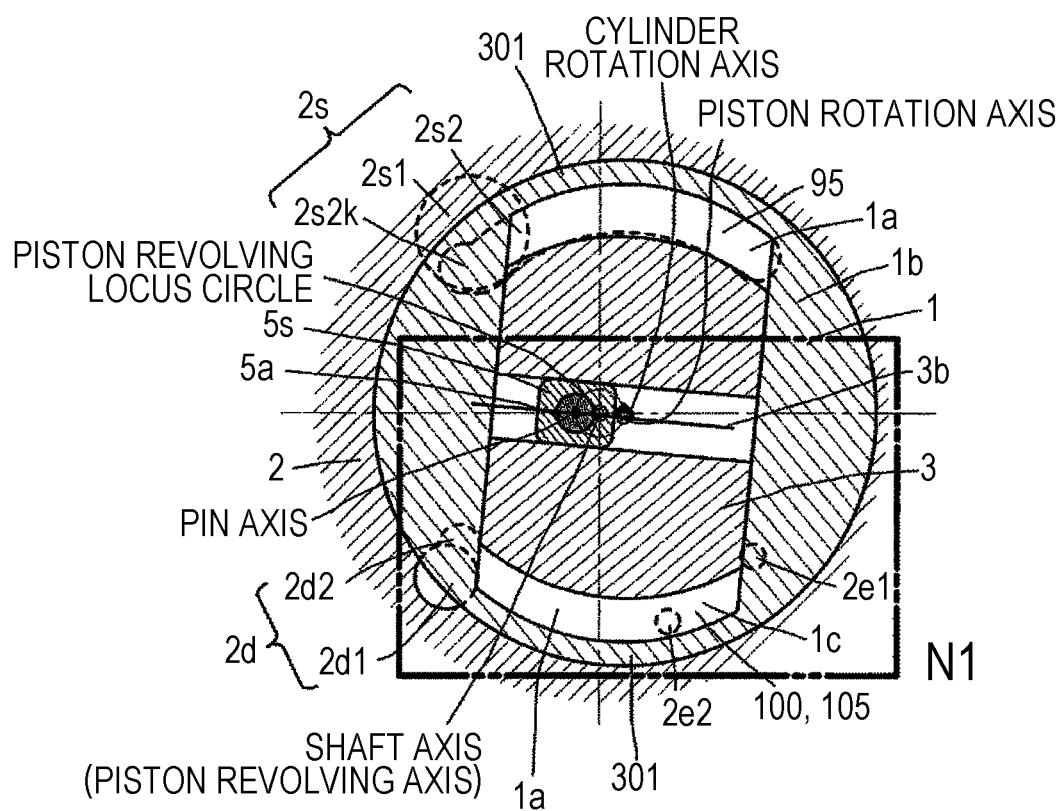
FIG. 16 is an enlarged sectional view in a state (between a crank angle of 180 degrees and a crank angle of 225 degrees in FIG. 9) in which one working chamber of the RC compressor according to the first embodiment transitions from a specific compression stroke to a specific discharge stroke.

FIG. 16 is an enlarged view at such timing that one working chamber transitions from the compression stroke to the discharge stroke in a case where a later-described bypass flapper valve 22 (FIG. 28) does not operate, and illustrates a state between a crank angle of 180 degrees and a crank angle of 225 degrees as in FIG. 11.

Operation of the compression portion is as illustrated in FIGS. 11, 15, and 16 (all illustrating a section slightly below the B-B section of FIG. 1).

As illustrated in FIG. 11, the revolving piston 3 relatively performs the reciprocation motion in the cylinder groove 1c in association with rotation of the rolling cylinder 1 having the cylinder groove 1c. In other words, the revolving piston 3 performs, in the cylinder groove 1c, the reciprocation motion relative to the cylinder groove 1c between the cylinder groove outer peripheral walls 301 at both end portions of the cylinder groove 1c.

Details have been described in Patent Literature 1, and therefore, will be omitted.

The cylinder groove outer peripheral walls 301 are provided in the present invention, and therefore, the present invention is different from Patent Literature 1 in arrangement of the suction path 2s and the discharge path 2d. However, operation of the compression portion is not different in principle.

Hereinafter, contents regarding the features of the present invention will be described.

As illustrated in FIG. 11, in the middle of the compression operation, two working chambers are each formed adjacent to two piston eccentric circular column tip end surfaces 3e (see FIG. 2) of the revolving piston 3. In the case of a crank angle of 0 degree, one working chamber has a volume of 0, and the other working chamber has the maximum volume. That is, the working chamber with a volume of 0 is a discharge chamber 105 where the discharge stroke is completed or the suction chamber 95 where the suction stroke begins, and the working chamber with the maximum volume is the suction chamber 95 where the suction stroke is completed or the compression chamber 100 where the compression stroke begins.

A rotation direction of the crankshaft 6 and a rotation direction of the rolling cylinder 1 are the same direction. In the present embodiment, both directions indicate the case of rotation in a clockwise direction (FIGS. 2 and 3 illustrate arrows indicating the rotation direction of the rolling cylinder 1).

The suction path 2s (the suction flow path) illustrated in close-up in FIG. 3 is provided such that the suction stroke is performed in the working chamber (the left working chamber of the revolving piston 3) with a volume of 0 in the process of rotating the rolling cylinder 1 clockwise from the state of a crank angle of 0 degree.

Specifically, in FIG. 3, a large portion of the suction groove 2s2 is provided at a position shifted inward of a side surface of the eccentric cylinder hole 2b by about the thickness of the cylinder groove outer peripheral wall (in the present embodiment, the thickness of the uniform wall 1w (see FIG. 13)). On the other hand, an end portion of the suction groove 2s2 is bent to provide the suction groove bending portion 2s2k such that the suction chamber 95 faces the suction groove 2s2 from the point of start of the suction stroke. The suction groove bending portion 2s2k described herein is provided not to face the discharge chamber 105 and not to cross the uniform wall 1w. Further, the suction hole 2s1 is provided to connect the suction groove 2s2 and the suction groove bending portion 2s2k with the upper surface of the stationary cylinder 2. The suction hole 2s1 described herein is provided not to penetrate the bottom surface of the eccentric cylinder hole 2b. The suction groove 2s2 and suction hole 2s1 as described above are provided to form the suction path 2s as a zone of the suction flow path closer to the suction chamber.

With this configuration, a flow path extending over the working chamber formed inside the uniform walls 1w as the cylinder groove outer peripheral walls and a clearance space between the cylinder outer peripheral surface 1s and the side surface of the eccentric cylinder hole 2b as a clearance region formed outside the uniform wall 1w is eliminated. Thus, sealability of a space communicating with the clearance space between the cylinder outer peripheral surface 1s and the side surface of the eccentric cylinder hole 2b and suction pressure spaces such as the suction chamber 95 and the suction path 2s (the suction hole 2s1 and the suction groove 2s2) is improved.

In the present embodiment, the clearance space between the cylinder outer peripheral surface 1s and the side surface of the eccentric cylinder hole 2b is connected to the back pressure chamber 110 held at the discharge pressure. Thus, leakage of fluid with the discharge pressure from the back pressure chamber 110 into the suction chamber 95 can be reduced, and therefore, the effect of improving a volume efficiency and the compressor efficiency is provided.

When the rolling cylinder 1 further rotates clockwise, the working chamber where the volume is the maximum volume is, for performing the compression stroke as the compression chamber 100, brought into a hermetic state in which the working chamber does not communicate with the discharge path 2d (the discharge hole 2d1 and the discharge groove 2d2) as a zone of the discharge flow path closer to the discharge chamber and the suction path 2s (the suction hole 2s1 and the suction groove 2s2) as the zone of the suction flow path closer to the suction chamber. That is, the working chamber transitions to a specific compression stroke.

In the present embodiment, the discharge path 2d is provided at such a position that the discharge path 2d begins communicating when the volume of the compression chamber 100 decreases to a volume obtained by dividing the volume of the suction chamber 95 upon completion of the suction stroke by 2.2 to increase the pressure of working fluid (see FIG. 16). That is, the present embodiment describes the case of a specific compression ratio of 2.2. From such a state, the compression chamber 100 constantly becomes the discharge chamber 105, and the discharge path 2d is provided to communicate with the discharge chamber 105 across an entire period of a specific discharge stroke. That is, the discharge path 2d is provided with such a size at such a position that the discharge path 2d is shifted from the discharge chamber 105 upon completion of the specific discharge stroke when the volume of the discharge chamber 105 reaches zero (see FIGS. 2 and 15). Note that the specific volume ratio is not limited to such a numerical value as long as compression and discharge functions of the compressor are obtained. As a result, working fluid with increased pressure can flow out to above the compression portion without the need for providing a discharge valve, and therefore, the effect of reducing discharge flow path resistance and realizing a high compressor efficiency is provided.

Oil sent to the oil supply vertical hole 6b by the oil supply pump 200 is supplied to the compression portion through some flow paths.

One flow path is a flow path for supplying oil from an opening of an uppermost portion of the oil supply vertical hole 6b to the pin slide mechanism including the slide groove 3b and the pin mechanism 5 through the shaft eccentric end space 115 surrounded by the crankshaft 6, the revolving bearing 23, and the revolving piston 3. Part of such oil flows into the working chamber while lubricating and sealing a clearance where the piston upper surface 3d and the piston cut surfaces 3c slide, thereby providing the effect of reducing a friction loss of the slide portion and internal leakage to improve the compressor efficiency.

The oil having flowed into the working chamber is mixed with working fluid in the working chamber, and forms an oil film in a leakage flow path upon leakage of working fluid during the suction, compression, or discharge stroke. Thus, internal leakage is reduced, and the compressor efficiency is improved. Then, such oil is, together with the working fluid, discharged to a portion above the compression portion.

However, a large portion of oil supplied to the pin slide mechanism joins oil directly flowing from the shaft eccentric end space 115, and passes through the eccentric oil supply groove 6h. Then, the oil enters the back pressure chamber 110 while lubricating the revolving bearing 23.

Moreover, there is a flow path reaching the back pressure chamber 110 through the flange receiving cutouts 4c1 and a lower portion of the shaft flange portion 6c of the oil supply main shaft groove 6k after a flow path reaching the oil supply main shaft groove 6k while lubricating the lower main bearing 24b through the oil supply lower main horizontal hole 6f and a flow path for lubricating the upper main bearing 24a at the oil supply upper main horizontal hole 6e and the oil supply main shaft groove 6k have joined each other at the oil supply main shaft groove 6k. In this case, oil also lubricates a portion (a thrust bearing portion of the crankshaft 6) between the shaft flange portion 6*c* and the flange receiving surface 4*c*.

As described above, most of oil flowing upward in the oil supply vertical hole 6*b* flows into the back pressure chamber 110. Then, such oil flows into the bed back pressure chamber 110*a* through the bed radiation grooves 4*e* of the bed surface 4*d* of the back pressure chamber 110, and thereafter, flows out to a portion below the compression portion through the oil discharge path 4*x*.

In a case where a flow path for discharging working fluid from the discharge chamber 105 is only the discharge hole 2*d*1, over-compression that the internal pressure of the compression chamber 100 reaches equal to or higher than the discharge pressure is caused before the specific discharge stroke. For this reason, the amount of energy consumed by the RC compressor increases, and the compressor efficiency decreases.

For this reason, the bypass hole is provided as a bypass of the discharge hole 2*d*1, and the valve is placed in the middle to open only in a case where the internal pressure of the compression chamber 100 exceeds the discharge pressure. As such a bypass valve flow path, the minimum pressure uniform wall bypass hole 2*e*1 and the high-pressure-side uniform wall bypass hole 2*e*2 (see FIGS. 15 and 16) provided with the bypass lead valves 21 (see FIG. 12) are provided.

With this configuration, over-compression can be effectively reduced in the case of operation under a condition (an over-compression condition) where an operation pressure ratio is less than the specific volume ratio, and therefore, the effect of improving the compressor efficiency is provided. Specifically, when a placement position is a spot described later, a rotation angle period (a rolling cylinder rotation angle period) in which the minimum pressure uniform wall bypass hole 2*e*1 opens to the compression chamber 100 is, as a result, increased and a rotation angle period (a rolling cylinder rotation angle period) in which two bypass valve flow paths open to the compression chamber 100 is increased. Thus, the effect of significantly reducing flow path resistance of the bypass value flow path, further reducing over-compression, and further improving the compressor efficiency is provided.

Moreover, in the present embodiment, the minimum pressure uniform wall bypass hole 2*e*1 is provided at a position opening from the suction chamber 95, as seen from FIG. 15. Thus, even when liquefied working fluid flows into the suction chamber 95 to cause liquid compression at, e.g., the start of operation, the minimum pressure uniform wall bypass hole 2*e*1 acts as a flow path for discharging the liquid. Consequently, liquid compression can be reliably avoided, and the probability of damage of the RC compressor can be reduced. As a result, the effect of improving the reliability of the RC compressor is provided.

As described above, in the present embodiment, it is configured such that in an extended period of the specific compression stroke including a period right before the start of the specific compression stroke (right before the end of the suction stroke) and a period right after the end of the specific compression stroke (right after the start of the specific discharge stroke), the bypass valve flow path is placed in the compression chamber 100 (in a precise sense, the suction chamber 95 in the period right before the start of the specific compression stroke, the discharge chamber 105 in the period right after the end of the specific compression stroke).

Moreover, the shape of the bypass valve flow path is in a circular shape, and therefore, the effect of facilitating hole processing and reducing the manufacturing cost is also provided.

As illustrated in FIG. 12, the bypass lead valve 21 is configured such that the lead valve plate 21*a* is mounted on the lead valve seat 21*c* and these components are, together with the lead retainer 21*f*, fixed with the lead valve screw 21*g*. Such a configuration is extremely simple, and therefore, a manufacturing cost reduction effect is provided.

Next, the placement position of the minimum pressure uniform wall bypass hole 2*e*1 will be described with reference to FIG. 17 (an enlarged view of an N1 portion of FIG. 16). Hatching in FIG. 17 does not indicate a section, but is used for distinguishing various regions. Moreover, thick chain double-dashed lines indicate the outer shape lines of the revolving piston 3 and the cylinder groove at the start of the compression stroke (FIG. 15). Further, the minimum pressure uniform wall bypass hole 2*e*1 (the same applies to the high-pressure-side uniform wall bypass hole 2*e*2 and the discharge path 2*d*) on a near side on the plane of paper is indicated by a dashed line for the sake of convenience.

Figure 17:
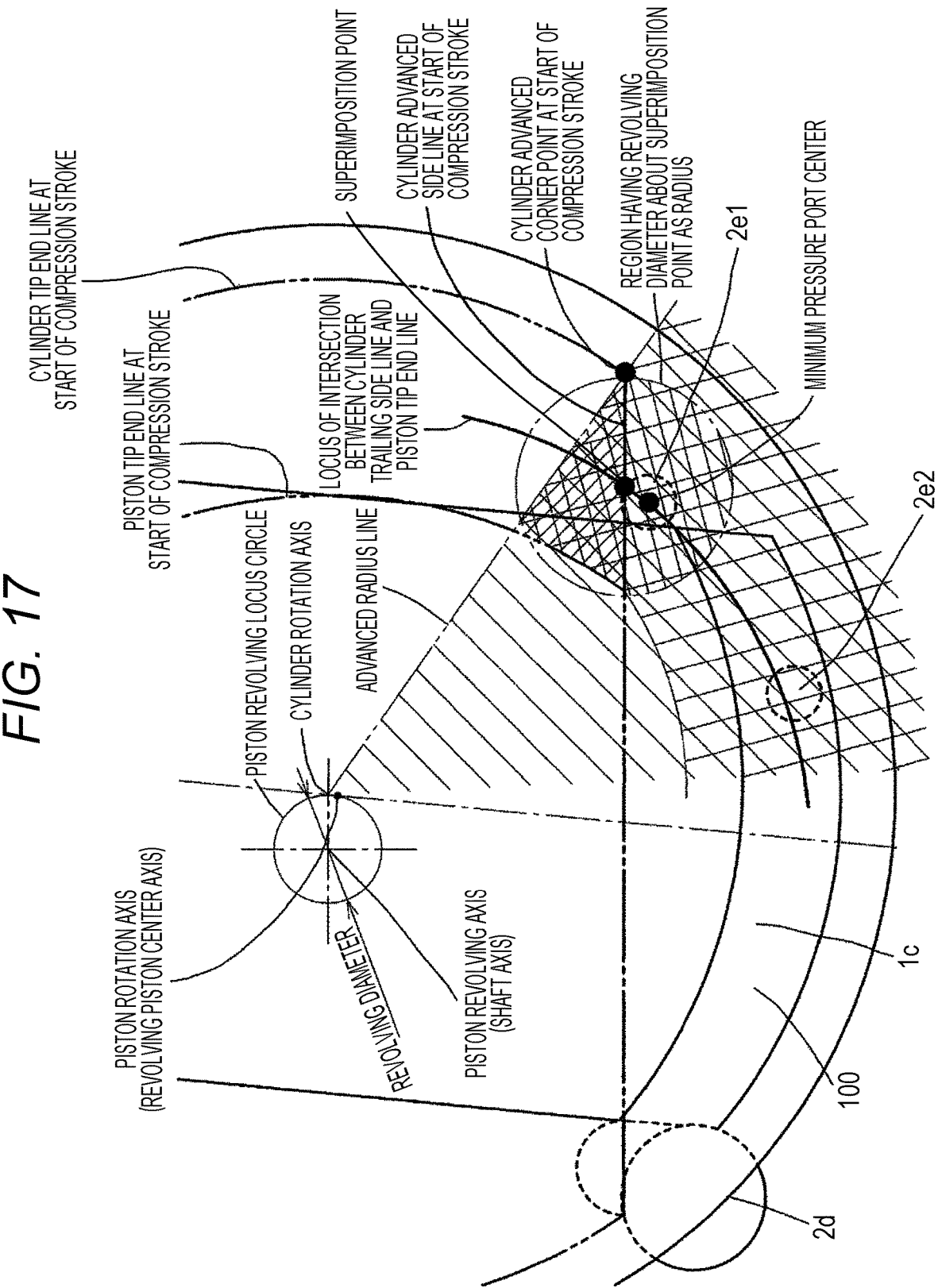
FIG. 17 is an enlarged sectional view of an N1 portion illustrated in FIG. 16.

FIG. 17 can be taken as a projection view of each element on the bottom surface of the eccentric cylinder hole 2*b* as a cylinder end surface, and therefore, description is also made from a perspective of the projection view, as necessary. Further, the minimum pressure uniform wall bypass hole 2*e*1 (the same applies to the high-pressure-side uniform wall bypass hole 2*e*2) is a vertical hole, and therefore, the minimum pressure uniform wall bypass hole 2*e*1 (the same applies to the high-pressure-side uniform wall bypass hole 2*e*2) indicated by the dashed line is coincident with the position of a minimum pressure bypass port as a working-chamber-side opening of the minimum pressure uniform wall bypass hole 2*e*1 (a minimum pressure port). Thus, the center (also referred to as a "minimum pressure port center") of the minimum pressure port is the center of a circle defining the minimum pressure uniform wall bypass hole 2*e*1.

Note that in FIG. 17, the stationary cylinder 2 and the revolving piston 3 rotate in the clockwise direction. Moreover, the term "projection figure" used in description below is based on an assumption that the upper surfaces of the revolving piston, the rolling cylinder, the cylinder grooves and the like illustrated in FIG. 17 are perpendicular to the center axis of the compression portion. An "advanced side" indicates a leading portion in the rotation direction. On the other hand, a "trailing side" indicates a portion passing with a delay in the rotation direction.

In FIG. 17, the center of the circle of the minimum pressure uniform wall bypass hole 2*e*1 as the center of the minimum pressure port is provided in a rotation advanced-side region (a region hatched downwardly to the left with 45 degrees) with respect to an advanced radius line as a line connected to the rotation center of the rolling cylinder from a cylinder advanced corner point as a connection point between a cylinder advanced-side line as a projection figure of a rotation advanced-side surface of the cylinder groove 1*c* and a cylinder tip end line as a projection figure of a cylinder tip end surface on a cylinder bottom surface.

With this configuration, the minimum pressure uniform wall bypass hole 2*e*1 can be placed at a position apart from a trailing-side surface of the cylinder groove 1*c*, and therefore, a long rotation angle period in which the minimum pressure uniform wall bypass hole 2*e*1 opens to the compression chamber 100 can be taken. Thus, a rotation angle period in which both of the minimum pressure uniform wall bypass hole 2e1 and the high-pressure-side uniform wall bypass hole 2e2 open can be extended. Consequently, an excessive increase in the discharge pressure, such as over-compression under the over-compression condition, can be relieved, and therefore, the effect of improving the compressor efficiency is provided.

Further, in FIG. 17, the center of the circle of the minimum pressure uniform wall bypass hole 2e1 as the minimum pressure port center is provided in an outer peripheral side region (a region hatched downwardly to the right with 75 degrees) with respect to a piston tip end line as a projection figure of the piston eccentric circular column tip end surface 3e as the tip end surface of the revolving piston 3 defining the compression chamber 100 when the cylinder advanced-side line as the projection figure of the rotation advanced-side surface of the cylinder groove 1c passes through the minimum pressure port center. If the center of the circle of the minimum pressure uniform wall bypass hole 2e1 is in an inner region with respect to the piston tip end line when the cylinder advanced-side line passes through the minimum pressure port center, when the minimum pressure uniform wall bypass hole 2e1 opens to the compression chamber 100, the revolving piston 3 has been already at the opening or has been already positioned close to the opening, and for this reason, a long rotation angle period in which the minimum pressure uniform wall bypass hole 2e1 opens to the compression chamber 100 cannot be taken. For this reason, the center of the circle of the minimum pressure uniform wall bypass hole 2e1 is provided at a position in an outer region with respect to the piston tip end line when the cylinder advanced-side line passes through the minimum pressure port center, and therefore, a long rotation angle period in which the minimum pressure uniform wall bypass hole 2e1 opens to the compression chamber 100 can be taken.

Because of a reason similar to that in the case of providing the center in the rotation advanced-side region with respect to the advanced radius line, the effect of improving the compressor efficiency is provided.

Further, the center of the circle of the minimum pressure uniform wall bypass hole 2e1 as the center of the minimum pressure port is provided in a region (a region hatched downwardly to the left with 15 degrees) having, as a radius, a revolving diameter about a superimposition point at which the piston tip end line overlaps with an intersection between a cylinder trailing-side line (not shown) as a projection figure of a rotation trailing-side surface of the cylinder groove 1c and the cylinder advanced-side line at the start of the compression stroke. Such a superimposition point can be assumed as an intersection between the locus (a thickest solid line of FIG. 17) of an intersection between the cylinder trailing-side line and the piston tip end line and the cylinder advanced-side line at the start of the compression stroke. In FIG. 17, an end portion (a right end of the piston tip end line as indicated by a solid line in the figure) of the piston tip end line in the middle of the compression stroke overlaps with such a locus.

Note that the cylinder trailing-side line is a line paired with the cylinder advanced-side line.

As described above, the minimum pressure uniform wall bypass hole 2e1 is provided in the vicinity of the cylinder advanced-side line at the start of the compression stroke, and therefore, opens in the vicinity of a point at which formation of the compression chamber 100 begins. Thus, in the suction chamber 95 before formation of the compression chamber 100, an opening period can be shortened, and conversely, the rotation angle period in which the minimum pressure uniform wall bypass hole 2e1 opens to the compression chamber 100 is extended.

As long as the minimum pressure uniform wall bypass hole 2e1 is not hidden behind the revolving piston 3, the angular interval of the cylinder groove 1c increases as the center of the circle of the minimum pressure uniform wall bypass hole 2e1 as the center of the minimum pressure port moves closer to the cylinder rotation axis as the rotation center of the rolling cylinder 1. Thus, as long as the minimum pressure uniform wall bypass hole 2e1 provided in the vicinity of the superimposition point is not hidden behind the revolving piston 3 pushed from a cylinder rotation axis side, the minimum pressure uniform wall bypass hole 2e1 opens as closer to the center as possible to the compression chamber 100 across the entire width of the cylinder groove 1c.

As described above, the minimum pressure uniform wall bypass hole 2e1 is provided in the vicinity of the superimposition point so that the minimum pressure uniform wall bypass hole 2e1 can open to the compression chamber 100 for an extremely-long rotation angle period. Because of a reason similar to that in the above-described case, the effect of significantly improving the compressor efficiency is provided.

Further, the minimum pressure uniform wall bypass hole 2e1 as the minimum pressure port is provided such that at least part of the minimum pressure uniform wall bypass hole 2e1 is included in a rotation trailing-side region (a region hatched downwardly to the right with 45 degrees) with respect to the cylinder advanced-side line at the start of the compression stroke. Thus, the minimum pressure uniform wall bypass hole 2e1 also opens to the suction chamber 95. Consequently, even when liquefied working fluid flows into the suction chamber 95 at, e.g., the start of operation to cause liquid compression, the minimum pressure uniform wall bypass hole 2e1 acts as the flow path for discharging the liquid. As a result, liquid compression can be reliably avoided, and the probability of damage of the RC compressor can be reduced. With this configuration, the effect of improving the reliability of the RC compressor is provided.

Second Embodiment

The present embodiment is an example where the thickness of a cylinder groove outer peripheral wall of a rolling cylinder is not uniform.

Figure 18:
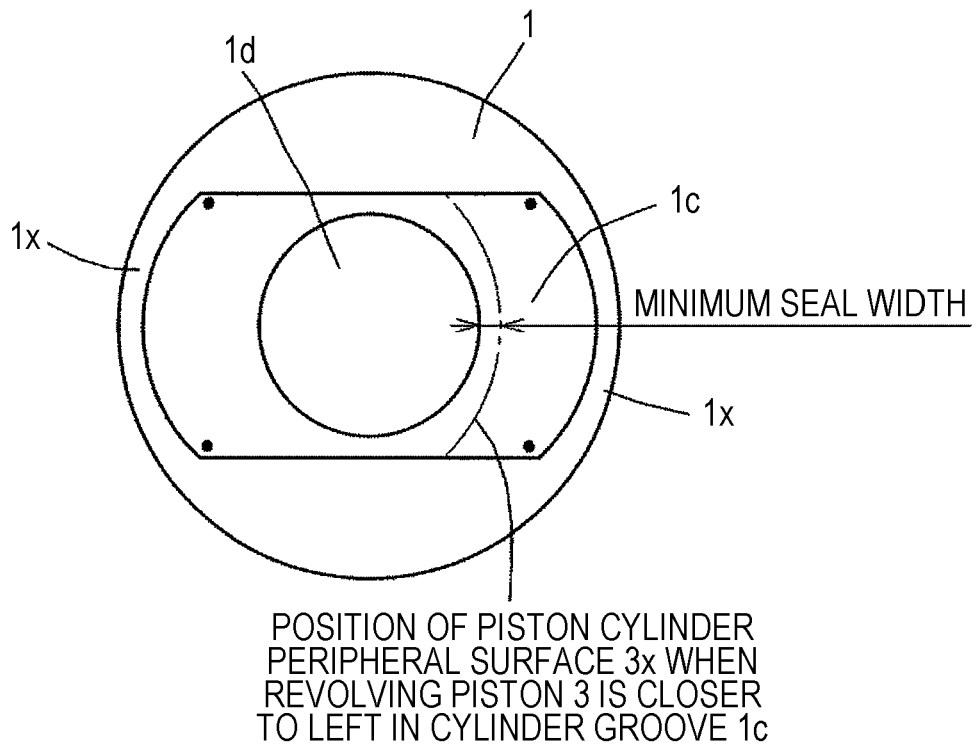
FIG. 18 is an upper view of a rolling cylinder of an RC compressor according to a second embodiment.
Figure 19:
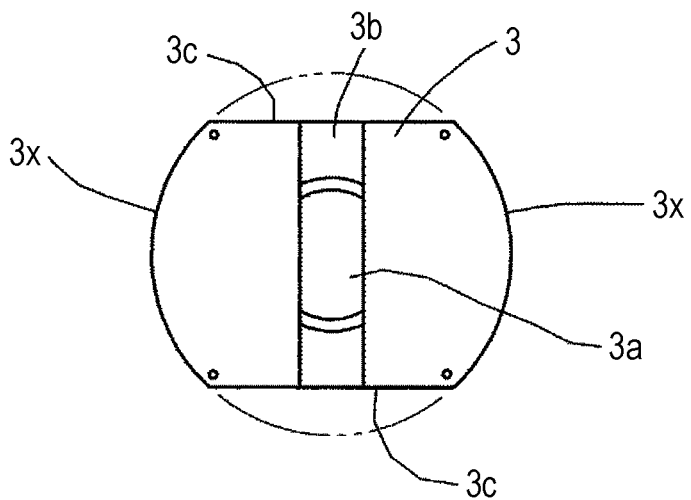
FIG. 19 is an upper view of a revolving piston of the RC compressor according to the second embodiment.
Figure 20:
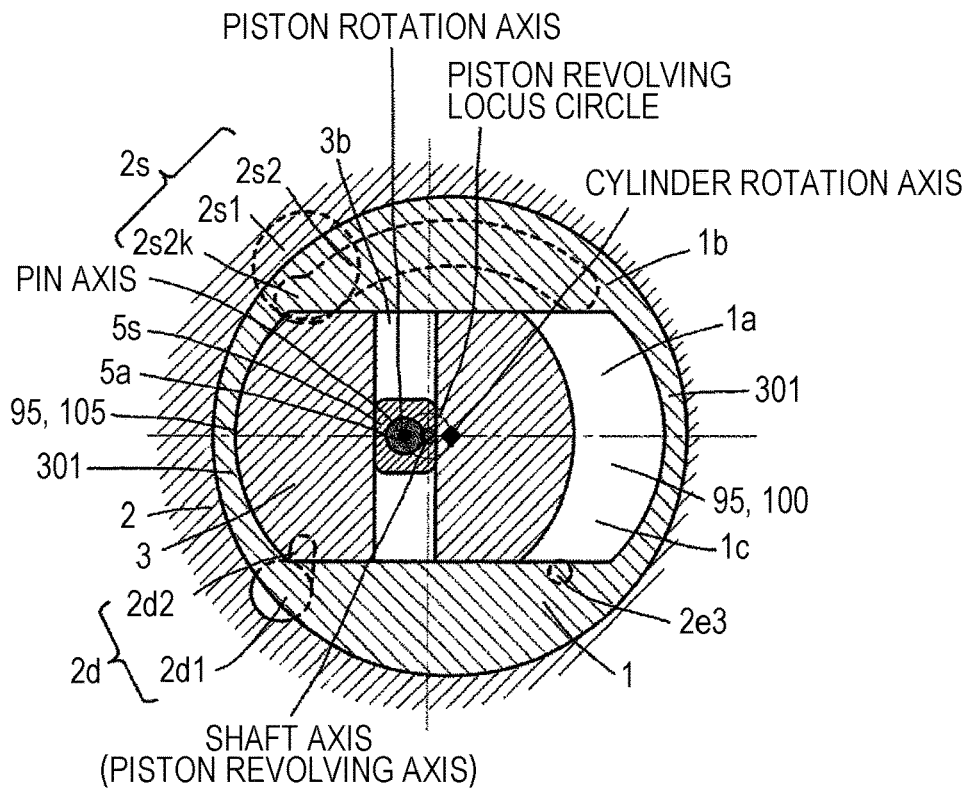
FIG. 20 is an enlarged sectional view in a state (a crank angle of 0 degree in FIG. 9) at the start of a suction stroke in the RC compressor according to the second embodiment.

FIG. 18 is an upper view of the rolling cylinder.
FIG. 19 is an upper view of a revolving piston.
FIG. 20 is an enlarged view when the rolling cylinder and the revolving piston are combined such that a working chamber (a working chamber where a discharge stroke transitions to a suction stroke and a volume is zero) at the start of the suction stroke and a working chamber (a working chamber where the suction stroke transitions to a compression stroke and a volume is maximum) coexist and a crank angle is 0 degree as in FIG. 11.

Figure 21:
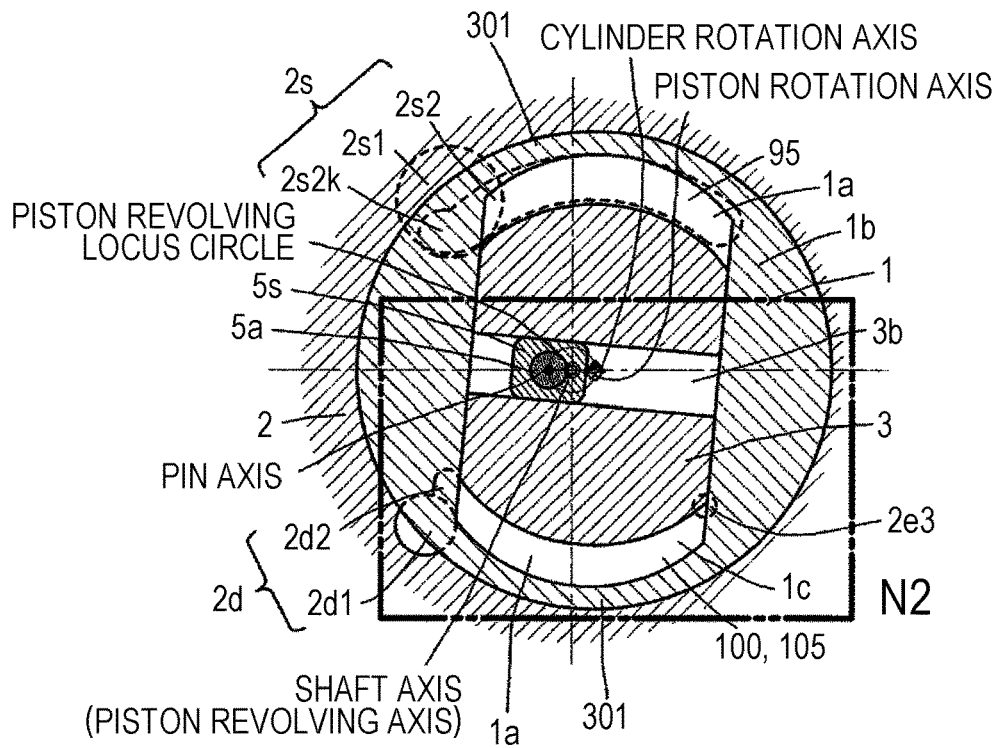
FIG. 21 is an enlarged sectional view in a state (between a crank angle of 180 degrees and a crank angle of 225 degrees in FIG. 9) in which one working chamber of the RC compressor according to the second embodiment transitions from a specific compression stroke to a specific discharge stroke.

FIG. 21 is an enlarged view when one working chamber transitions from the compression stroke to the discharge stroke and the crank angle is between 180 degrees and 225 degrees as in FIG. 11.

A suction groove 2s2 and a discharge groove 2d2 on the upper side of a cross-section of FIGS. 20 and 21 and a minimum pressure non-uniform wall bypass hole 2e3 are indicated by dashed lines for the sake of convenience.

Figure 22:
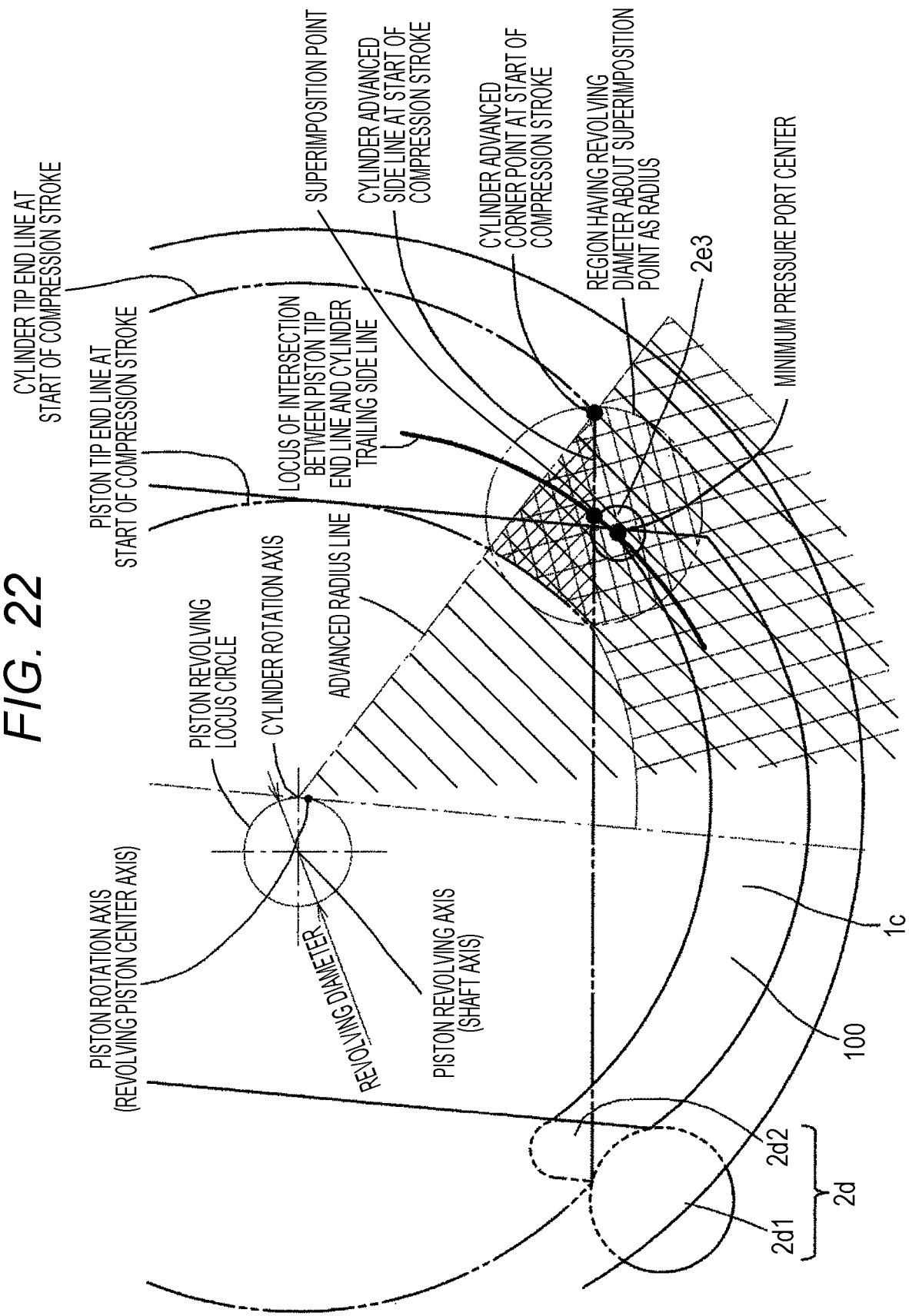
FIG. 22 is an enlarged sectional view of an N2 portion of FIG. 21.

FIG. 22 is an enlarged cross-sectional view of an N2 portion of FIG. 21, the minimum pressure non-uniform wall bypass hole 2e3 opening at the N2 portion.

As illustrated in FIG. 19, in the present embodiment, two tip end surfaces of the revolving piston 3 are piston circular column tip end surfaces 3x having the same center axis. In response, the cylinder groove outer peripheral wall is, as illustrated in FIG. 18, a non-uniform wall 1x configured such that the thickness thereof increases toward both end sides in a circumferential direction. Other configurations are similar to those of the first embodiment, and therefore, description of similar contents will be omitted.

The revolving piston 3 is coaxial with a revolving bearing hole 3a, and piston cut surfaces 3c may be processed after the piston circular column tip end surfaces 3x as the tip end surfaces have been processed. Thus, the revolving bearing hole 3a and the piston circular column tip end surfaces 3x can be processed with high coaxiality by lathe processing by the same chucking, and therefore, the effect of reducing a manufacturing cost is provided.

Moreover, a gas load is on the cylinder groove outer peripheral wall, and therefore, high stiffness is necessary. In the present embodiment, the cylinder groove outer peripheral wall is the non-uniform wall 1x configured such that the thickness thereof increases toward both end sides in the circumferential direction. Thus, a wall base is thick. Consequently, the cylinder groove outer peripheral wall with high stiffness is provided. With this configuration, the effect of reducing deformation due to the gas load, reducing the risk of contact between a cylinder groove outer peripheral wall inner surface and the tip end surface of the revolving piston 3 and contact between a cylinder groove outer peripheral wall outer surface and an inner peripheral surface of an eccentric cylinder hole 2b, and improving reliability is provided.

Further, as illustrated in FIG. 22, a tangent line at an intersection between a piston tip end line and a cylinder trailing-side line is, as compared to the first embodiment, closer to the cylinder trailing-side line as compared to a tangent line at an intersection between a cylinder outer peripheral line as a projection figure of a cylinder outer peripheral surface 1s as an outer peripheral surface of the rolling cylinder 1 and an extended line of the cylinder trailing-side line. That is, the shape of a compression chamber 100 is cut toward the center in the vicinity of the cylinder trailing-side line.

With this configuration, an opening is less closed even when coming closer to the piston tip end line, and a rotation angle period until the opening is fully closed after the opening has begun closing is extended. Thus, a rotation angle period in which the minimum pressure non-uniform wall bypass hole 2e3 opens to the compression chamber 100 is further extended, and the single minimum pressure non-uniform wall bypass hole 2e3 can connect the compression chamber 100 and a discharge space across the entirety of a specific compression stroke. Consequently, the number of bypass valve flow paths can be reduced, and therefore, the effect of reducing a processing cost is provided. Such an effect can be, without reducing the number of bypass valve flow paths, also used for extending a rotation angle period in which multiple bypass valve flow paths open. In this case, an unnecessary discharge pressure increase including overcompression can be reduced, and therefore, the effect of improving a compressor efficiency is provided.

Third Embodiment

The present embodiment is also an example where the thickness of a cylinder groove outer peripheral wall of a rolling cylinder is not uniform.

Figure 23:
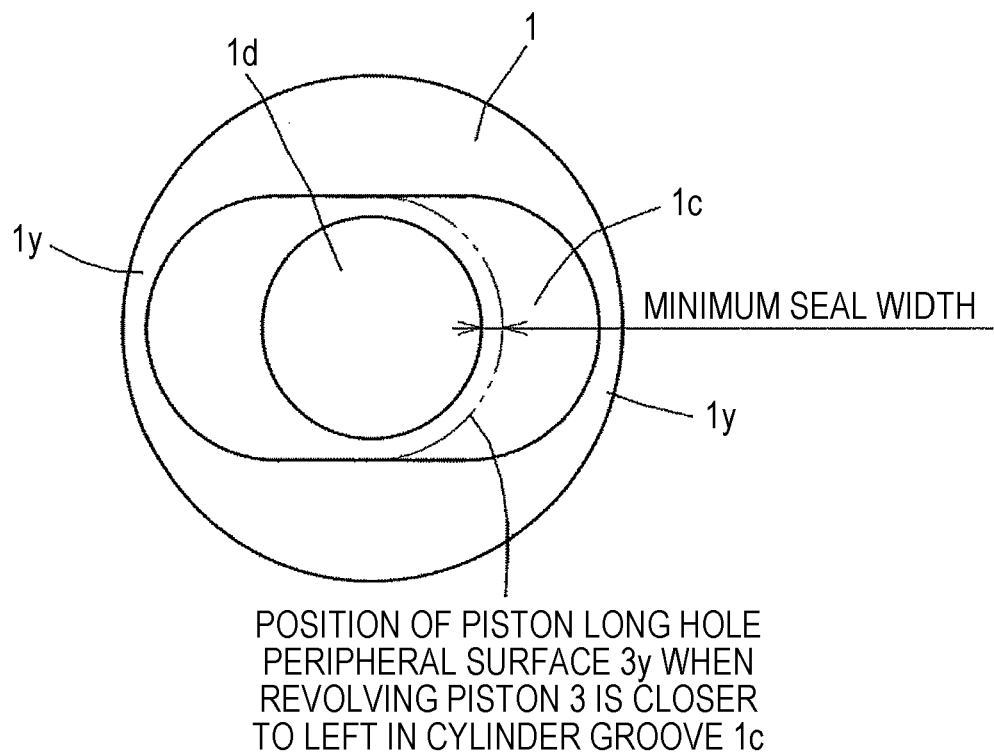
FIG. 23 is an upper view of a rolling cylinder of an RC compressor according to a third embodiment.

FIG. 23 is an upper view of the rolling cylinder.

As illustrated in this figure, the inside of a long hole formation wall 1y is in a semi-circular shape as viewed from above.

Figure 24:
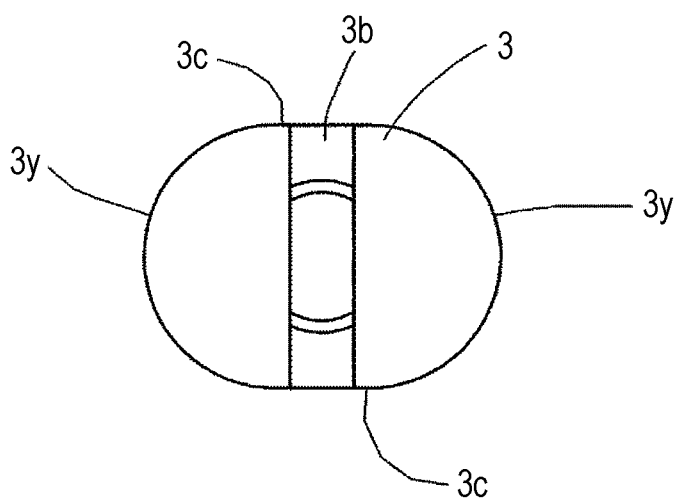
FIG. 24 is an upper view of a revolving piston of the RC compressor according to the third embodiment.

FIG. 24 is an upper view of a revolving piston.

As illustrated in this figure, piston semi-circular column tip end surfaces 3y are in a semi-circular shape as viewed from above.

Figure 25:
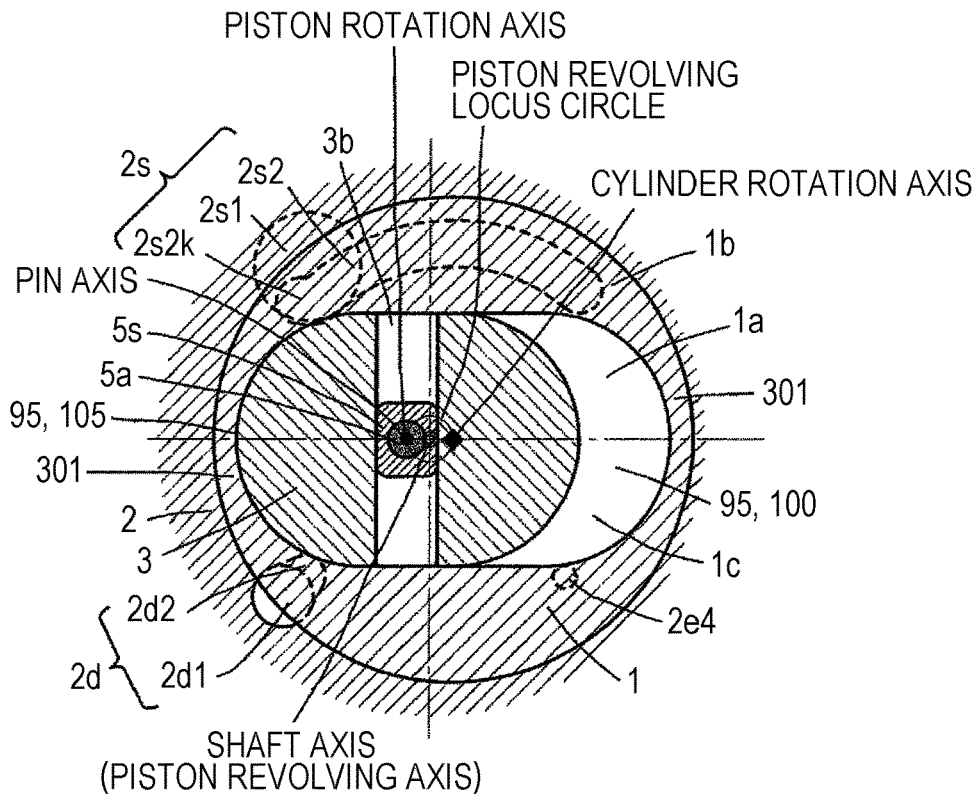
FIG. 25 is an enlarged sectional view in a state (a crank angle of 0 degree in FIG. 9) at the start of a suction stroke in the RC compressor according to the third embodiment.

FIG. 25 is an enlarged view when the rolling cylinder and the revolving piston are combined such that a working chamber (a working chamber where a discharge stroke transitions to a suction stroke and a volume is zero) at the start of the suction stroke and a working chamber (a working chamber where the suction stroke transitions to a compression stroke and the volume is maximum) coexist and a crank angle is 0 degree as in FIG. 11.

Figure 26:
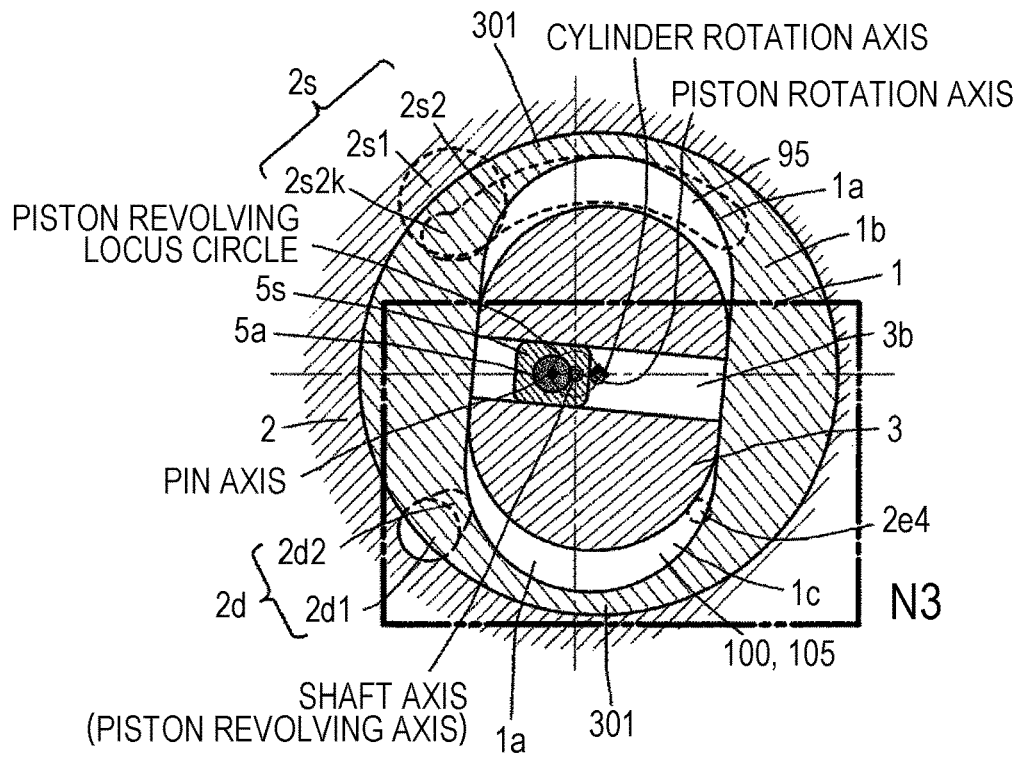
FIG. 26 is an enlarged sectional view in a state (between a crank angle of 180 degrees and a crank angle of 225 degrees in FIG. 9) in which one working chamber of the RC compressor according to the third embodiment transitions from a specific compression stroke to a specific discharge stroke.

FIG. 26 is an enlarged view when one working chamber transitions from the compression stroke to the discharge stroke and the crank angle is between 180 degrees and 225 degrees as in FIG. 11.

A suction groove 2s2 and a discharge groove 2d2 on the upper side of a cross-section of FIGS. 25 and 26 and a minimum pressure long hole formation wall bypass hole 2e4 are indicated by dashed lines for the sake of convenience.

Figure 27:
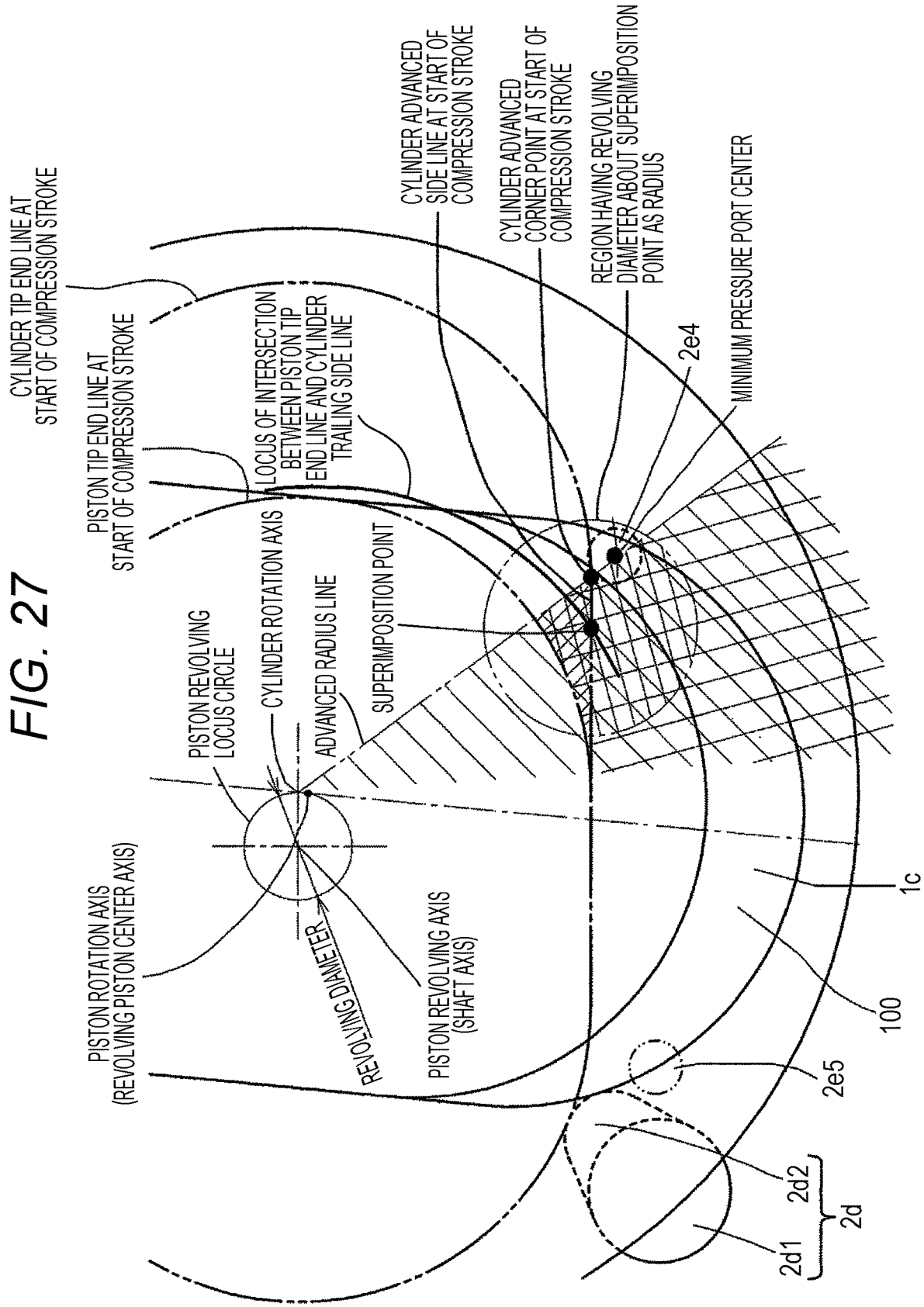
FIG. 27 is an enlarged sectional view of an N3 portion of FIG. 26.

FIG. 27 is an enlarged cross-sectional view of an N3 portion of FIG. 26, the minimum pressure long hole formation wall bypass hole 2e4 opening at the N3 portion.

As illustrated in FIG. 23, in the present embodiment, the cylinder groove outer peripheral wall is the long hole formation wall 1y configured such that the thickness thereof extremely increases toward both end sides in a circumferential direction, and therefore, a wall base is extremely thick. Thus, the cylinder groove outer peripheral wall having extremely-high stiffness is provided, and the effect of fully reducing deformation due to a gas load, reducing, with an extremely-high degree of certainty, the risk of contact between a cylinder groove outer peripheral wall inner surface and the tip end surface of the revolving piston 3 and contact between a cylinder groove outer peripheral wall outer surface and an inner peripheral surface of an eccentric cylinder hole 2b, and extremely improving reliability is provided.

Moreover, deformation of the cylinder groove outer peripheral wall outer surface is extremely reduced. Thus, the coefficient of friction with the inner peripheral surface of the eccentric cylinder hole 2b can be extremely decreased, and a friction loss can be further reduced. Consequently, the effect of further improving a compressor efficiency is provided.

Further, the cylinder groove 1c can be processed by an end mill having, as a diameter, a distance between two piston cut surfaces 3c. Thus, the effect of reducing a processing cost is provided.

In addition, as illustrated in FIG. 27, a tangent line at an intersection between a piston tip end line and a cylinder trailing-side line is coincident with the cylinder trailing-side line. Thus, such a tangent line is ultimately closer to the cylinder trailing-side line as compared to a tangent line at an intersection between a cylinder outer peripheral line as a projection figure of a cylinder outer peripheral surface 1s as an outer peripheral surface of the rolling cylinder 1 and an extended line of the cylinder trailing-side line. That is, the shape of a compression chamber 100 is ultimately cut toward the center in the vicinity of the cylinder trailing-side line.

With this configuration, an opening is much less closed even when coming closer to the piston tip end line, and a rotation angle period until the opening is fully closed after the opening has begun closing is extended. Thus, a rotation angle period in which the minimum pressure long hole formation wall bypass hole 2e4 opens to the compression chamber 100 is further extended, and the single minimum pressure long hole formation wall bypass hole 2e4 can connect, with extra space, the compression chamber 100 and a discharge space across the entirety of a specific compression stroke. That is, even at the start of the specific discharge stroke (FIG. 26), the minimum pressure long hole formation wall bypass hole 2e4 is in a substantially fully-opened state. Consequently, the number of bypass valve flow paths can be reduced, and therefore, a processing cost can be reduced and an unnecessary discharge pressure increase including over-compression can be reduced. As a result, the effect of improving a compressor efficiency is provided.

Note that the minimum pressure long hole formation wall bypass hole 2e4 needs to be arranged not to communicate with a slide groove 3b. This is because the pressure of the slide groove 3b is constantly discharge pressure.

Further, in addition to the minimum pressure long hole formation wall bypass hole 2e4, a high-pressure-side long hole formation wall bypass hole 2e5 is preferably provided in the vicinity of the discharge groove 2d2. With this configuration, the bypass flow path can be ensured even in a period in which the minimum pressure long hole formation wall bypass hole 2e4 is closed in the compression stroke.

Fourth Embodiment

The present embodiment describes a variation of a bypass valve placed at a bypass valve flow path.

Figure 28:
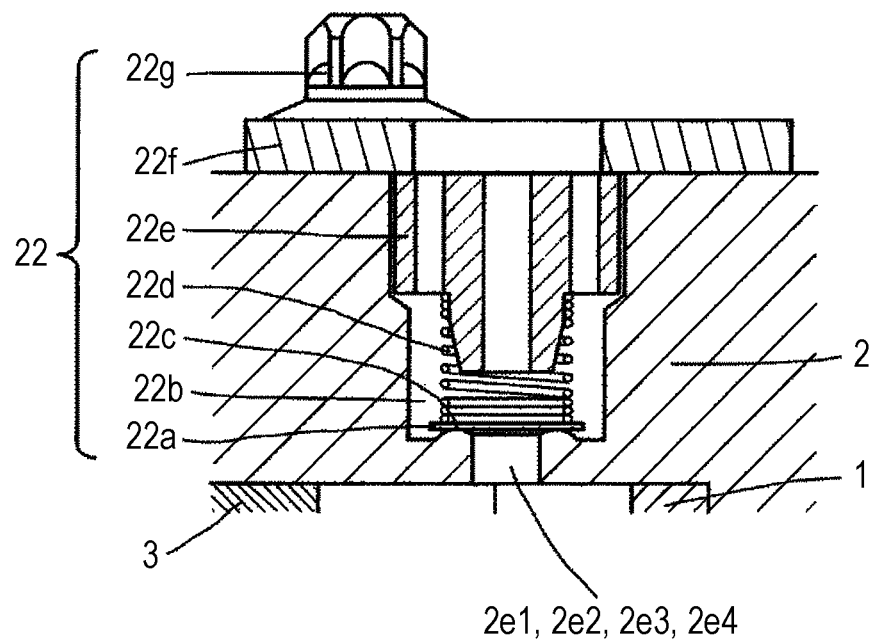
FIG. 28 is an enlarged sectional view of the Q portion of FIG. 1 in an RC compressor according to a fourth embodiment.

FIG. 28 is an enlarged view of the vicinity (a Q portion of FIG. 1) of a longitudinal section of a bypass hole. Note that the present embodiment is similar to the first to third embodiments, except that the bypass valve is a flapper-type bypass flapper valve 22. Thus, other portions than those of FIG. 28 will not be described.

In this figure, the bypass flapper valve 22 has such a structure that a flapper valve plate 22a is mounted on a flapper valve seat 22c provided at a bottom of a flapper valve hole 22b and is lightly pressed against the flapper valve seat 22c by a flapper stopper 22e attached to a flapper valve spring 22d. Moreover, the flapper stopper 22e is pressed by a flapper retainer 22f, and therefore, is not lifted. Such a flapper stopper 22e is fixed to a stationary cylinder 2 with a flapper valve screw 22g. With this configuration, the length of each bypass hole (2e1, 2e2, 2e3, 2e4, 2e5) is shortened. Thus, the effect of reducing a loss due to re-expansion and improving a compressor efficiency is provided.

Hereinafter, advantageous effects of the present invention will be collectively described.

According to the present invention, the compression chamber communicates either one of the discharge flow path or the minimum pressure bypass port, and therefore, the minimum pressure bypass port can reduce over-compression in the compression stroke.

According to the present invention, at least part of the minimum pressure bypass port is arranged in the rotation trailing-side region with respect to the cylinder advanced-side line at the start of the compression stroke, and therefore, liquid compression at the start of the compression stroke can be avoided.

Note that since the compression chamber is arranged to communicate with either one of the discharge flow path or the minimum pressure bypass port and at least part of the minimum pressure bypass port is positioned in the rotation trailing-side region with respect to the cylinder advanced-side line at the start of the compression stroke, both of reduction in over-compression and prevention of liquid compression can be realized.

Moreover, according to the present invention, the rotation angle period (the rolling cylinder rotation angle period) of the minimum pressure bypass valve flow path can be extended, and the number of bypass valve flow paths to be placed can be reduced. With this configuration, the manufacturing cost can be reduced. Moreover, the number of bypass valve flow paths to be placed is reduced so that turbulence upon switching of the flow path can be reduced.

In some cases, the rotation angle period (the rolling cylinder rotation angle period) in which the multiple bypass valve flow paths open to the compression chamber is extended without decreasing the number of bypass valves to be placed. Thus, bypass valve flow path resistance can be reduced, and an over-compression reduction effect can be improved. Consequently, the compressor efficiency can be improved.

Further, the rotation angle period (the rolling cylinder rotation angle period) of the bypass valve flow path in the suction stroke is extended without decreasing the number of bypass valves to be placed. Thus, liquid compression can be reliably avoided, and the reliability of the compressor can be improved.

In addition, the rotation angle period (the rolling cylinder rotation angle period) of the bypass valve flow path in the specific discharge stroke is extended without decreasing the number of bypass valves to be placed. Thus, the discharge flow path resistance can be reduced, and the compressor efficiency can be improved.

Moreover, according to the present invention, a discharge pressure increase can be suppressed by reduction in the flow path resistance of the bypass valve flow path and placement of the bypass valve flow path in parallel to the main discharge flow path, and therefore, the compressor efficiency can be improved. Further, liquid compression can be avoided by placement of the bypass valve flow path in parallel to the suction flow path, and therefore, the reliability of the compressor can be improved.

What is claimed is:
1. A rolling cylinder displacement compressor, comprising:
   a circular columnar rolling cylinder having a cylinder groove;
   a revolving piston having a slide groove;
   a stationary cylinder having a pin mechanism;
   a piston revolving drive source as a drive source of revolving motion of the revolving piston;
   a drive transmission portion connecting the revolving piston and the piston revolving drive source;
   a frame through which the drive transmission portion penetrates; and
   a casing incorporating the revolving piston, the rolling cylinder, the stationary cylinder, the piston revolving drive source, the drive transmission portion, and the frame,
   wherein the revolving piston, the rolling cylinder, and the stationary cylinder form a compression portion,
   the revolving piston relatively performs reciprocation motion in the cylinder groove,
   the stationary cylinder is provided with a suction flow path, a discharge flow path, and a bypass valve flow path, a suction chamber, a compression chamber, and a discharge chamber are formed by the reciprocation motion in the compression portion, a minimum pressure bypass port as an opening of a minimum pressure bypass valve flow path, which is connected to the compression chamber formed in the compression portion in a lowest pressure state, of the bypass valve flow path is arranged such that the compression chamber faces at least one of an opening of the discharge flow path or the minimum pressure bypass port, and the minimum pressure bypass port is configured such that a minimum pressure port center as the center of the minimum pressure bypass port is arranged in a rotation advanced-side region with respect to an advanced radius line as a line connecting a cylinder advanced corner point of the compression chamber at the start of a compression stroke and the rotation center of the rolling cylinder.

2. The rolling cylinder displacement compressor according to claim 1, wherein
the minimum pressure bypass port is arranged such that when a cylinder advanced-side line of the compression chamber passes through the minimum pressure port center as the center of the minimum pressure bypass port, the minimum pressure port center is at a position apart from a piston tip end line of the revolving piston defining the compression chamber to a cylinder tip end line side of the compression chamber.

3. The rolling cylinder displacement compressor according to claim 2, wherein
the minimum pressure port center is arranged in a region having, as a radius, a revolving diameter about a superimposition point as an intersection between a locus of an intersection between a cylinder trailing-side line of the compression chamber and the piston tip end line and the cylinder advanced-side line at the start of the compression stroke.

4. The rolling cylinder displacement compressor according to claim 3, wherein
at least part of the minimum pressure bypass port is arranged in a rotation trailing-side region with respect to the cylinder advanced-side line at the start of the compression stroke.

5. The rolling cylinder displacement compressor according to claim 4, wherein
a piston tip end surface of the revolving piston is formed such that a tangent line at the intersection between the piston tip end line and the cylinder trailing-side line is, as compared to a tangent line at an intersection between a cylinder outer peripheral line as a projection figure of a cylinder outer peripheral surface as an outer peripheral surface of the rolling cylinder and an extended line of the cylinder trailing-side line, closer to the cylinder trailing-side line.

6. The rolling cylinder displacement compressor according to claim 5, wherein
two piston tip end surfaces of the revolving piston share a center axis of a single circular column, and form a side surface of the circular column.

7. The rolling cylinder displacement compressor according to claim 5, wherein
each of two piston tip end surfaces of the revolving piston has a semi-circular columnar side surface shape.

8. The rolling cylinder displacement compressor according to claim 1, wherein
the minimum pressure bypass port is in a circular shape.

9. The rolling cylinder displacement compressor according to claim 1, wherein
the bypass valve flow path includes two bypass valve flow paths.

10. The rolling cylinder displacement compressor according to claim 1, wherein
the bypass valve flow path includes a single bypass valve flow path.

* * * * *